(12) United States Patent
Hazani et al.

(10) Patent No.: US 10,135,533 B2
(45) Date of Patent: Nov. 20, 2018

(54) ANALOG DISTRIBUTED ANTENNA SYSTEMS (DASS) SUPPORTING DISTRIBUTION OF DIGITAL COMMUNICATIONS SIGNALS INTERFACED FROM A DIGITAL SIGNAL SOURCE AND ANALOG RADIO FREQUENCY (RF) COMMUNICATIONS SIGNALS

(71) Applicant: Corning Optical Communications Wireless Ltd, Airport City (IL)

(72) Inventors: Ami Hazani, Ra'anana (IL); Eytan Radian, Hod Hasharon (IL)

(73) Assignee: Corning Optical Communications Wireless Ltd, Airport City (IL)

( * ) Notice: Subject to any disclaimer, the term of this patent is extended or adjusted under 35 U.S.C. 154(b) by 0 days.

(21) Appl. No.: 15/584,189

(22) Filed: May 2, 2017

(65) Prior Publication Data
US 2017/0237493 A1    Aug. 17, 2017

Related U.S. Application Data

(63) Continuation of application No. PCT/IL2015/051095, filed on Nov. 12, 2015.
(Continued)

(51) Int. Cl.
*H04B 10/2575* (2013.01)
*H04W 88/08* (2009.01)

(52) U.S. Cl.
CPC . *H04B 10/25753* (2013.01); *H04B 10/25751* (2013.01); *H04B 10/25752* (2013.01); *H04W 88/085* (2013.01); *H04B 10/2575* (2013.01)

(58) Field of Classification Search
CPC ........ H04B 10/25753; H04B 10/25752; H04B 10/25751; H04B 10/2575; H04W 88/085
(Continued)

(56) References Cited

U.S. PATENT DOCUMENTS

| 4,365,865 A | 12/1982 | Stiles |
| 4,867,527 A | 9/1989 | Dotti et al. |

(Continued)

FOREIGN PATENT DOCUMENTS

| AU | 645192 B2 | 1/1994 |
| AU | 731180 B2 | 3/2001 |

(Continued)

OTHER PUBLICATIONS

Advisory Action for U.S. Appl. No. 14/664,305, dated Oct. 30, 2017, 3 pages.
(Continued)

*Primary Examiner* — Shuwang Liu
*Assistant Examiner* — Fitwi Hailegiorgis
(74) *Attorney, Agent, or Firm* — C. Keith Montgomery

(57) ABSTRACT

Embodiments disclosed in the detailed description include analog distributed antenna system (DAS) supporting distribution of digital communications signals interfaced from a digital signal source and analog radio frequency (RF) communications signals. Analog RF communications signals received from analog RF signal sources are distributed in the analog DAS without being digitized. The analog DAS is also configured to interface with digital signal sources and compatibly distribute digital communications signals. Hence, a digital signal interface in head-end equipment (HEE) is configured to convert downlink digital communications signals to downlink analog RF communications signals for distribution to a plurality of remote units. The digital signal interface is also configured to convert uplink analog RF communications signals to uplink digital communications signals for distribution to the digital signal source(s). By providing the digital signal interface in the HEE, the analog DAS can be configured to distribute digital communications signals to analog DAS components.

16 Claims, 9 Drawing Sheets

Related U.S. Application Data

(60) Provisional application No. 62/079,090, filed on Nov. 13, 2014.

(58) Field of Classification Search
USPC .......................... 375/130, 295, 316; 370/278
See application file for complete search history.

(56) References Cited

U.S. PATENT DOCUMENTS

| | | |
|---|---|---|
| 4,889,977 A | 12/1989 | Haydon |
| 4,896,939 A | 1/1990 | O'Brien |
| 4,916,460 A | 4/1990 | Powell |
| 4,972,505 A | 11/1990 | Isberg |
| 5,039,195 A | 8/1991 | Jenkins et al. |
| 5,042,086 A | 8/1991 | Cole et al. |
| 5,125,060 A | 6/1992 | Edmundson |
| 5,189,718 A | 2/1993 | Barrett et al. |
| 5,189,719 A | 2/1993 | Coleman et al. |
| 5,206,655 A | 4/1993 | Caille et al. |
| 5,210,812 A | 5/1993 | Nilsson et al. |
| 5,260,957 A | 11/1993 | Hakimi et al. |
| 5,263,108 A | 11/1993 | Kurokawa et al. |
| 5,267,122 A | 11/1993 | Glover et al. |
| 5,268,971 A | 12/1993 | Nilsson et al. |
| 5,280,472 A | 1/1994 | Gilhousen et al. |
| 5,295,154 A | 3/1994 | Meier et al. |
| 5,299,947 A | 4/1994 | Barnard |
| 5,301,056 A | 4/1994 | O'Neill |
| 5,339,058 A | 8/1994 | Lique |
| 5,339,184 A | 8/1994 | Tang |
| 5,377,035 A | 12/1994 | Wang et al. |
| 5,379,455 A | 1/1995 | Koschek |
| 5,400,391 A | 3/1995 | Emura et al. |
| 5,404,570 A | 4/1995 | Charas et al. |
| 5,424,864 A | 6/1995 | Emura |
| 5,428,636 A | 6/1995 | Meier |
| 5,444,564 A | 8/1995 | Newberg |
| 5,457,557 A | 10/1995 | Zarem et al. |
| 5,459,727 A | 10/1995 | Vannucci |
| 5,469,523 A | 11/1995 | Blew et al. |
| 5,499,241 A | 3/1996 | Thompson et al. |
| 5,504,746 A | 4/1996 | Meier |
| 5,519,691 A | 5/1996 | Darcie et al. |
| 5,543,000 A | 8/1996 | Lique |
| 5,544,161 A | 8/1996 | Bigham et al. |
| 5,546,443 A | 8/1996 | Raith |
| 5,553,064 A | 9/1996 | Paff et al. |
| 5,557,698 A | 9/1996 | Gareis et al. |
| 5,574,815 A | 11/1996 | Kneeland |
| 5,598,288 A | 1/1997 | Collar |
| 5,603,080 A | 2/1997 | Kallander et al. |
| 5,615,034 A | 3/1997 | Hori |
| 5,621,786 A | 4/1997 | Fischer et al. |
| 5,627,879 A | 5/1997 | Russell et al. |
| 5,640,678 A | 6/1997 | Ishikawa et al. |
| 5,642,405 A | 6/1997 | Fischer et al. |
| 5,644,622 A | 7/1997 | Russell et al. |
| 5,648,961 A | 7/1997 | Ebihara |
| 5,651,081 A | 7/1997 | Blew et al. |
| 5,657,374 A | 8/1997 | Russell et al. |
| 5,668,562 A | 9/1997 | Cutrer et al. |
| 5,677,974 A | 10/1997 | Elms et al. |
| 5,682,256 A | 10/1997 | Motley et al. |
| 5,684,799 A | 11/1997 | Bigham et al. |
| 5,689,355 A | 11/1997 | Okubo et al. |
| 5,703,602 A | 12/1997 | Casebolt |
| 5,726,984 A | 3/1998 | Kubler et al. |
| 5,774,789 A | 6/1998 | van der Kaay et al. |
| 5,790,536 A | 8/1998 | Mahany et al. |
| 5,790,606 A | 8/1998 | Dent |
| 5,802,173 A | 9/1998 | Hamilton-Piercy et al. |
| 5,802,473 A | 9/1998 | Rutledge et al. |
| 5,805,983 A | 9/1998 | Naidu et al. |
| 5,809,422 A | 9/1998 | Raleigh et al. |
| 5,812,296 A | 9/1998 | Tarusawa et al. |
| 5,818,619 A | 10/1998 | Medved et al. |
| 5,821,510 A | 10/1998 | Cohen et al. |
| 5,825,651 A | 10/1998 | Gupta et al. |
| 5,825,829 A | 10/1998 | Borazjani et al. |
| 5,832,364 A | 11/1998 | Gustafson |
| 5,838,474 A | 11/1998 | Stilling |
| 5,852,651 A | 12/1998 | Fischer et al. |
| 5,854,986 A | 12/1998 | Dorren et al. |
| 5,867,485 A | 2/1999 | Chambers et al. |
| 5,880,863 A | 3/1999 | Rideout et al. |
| 5,881,200 A | 3/1999 | Burt |
| 5,883,882 A | 3/1999 | Schwartz |
| 5,890,055 A | 3/1999 | Chu et al. |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,946,622 A | 8/1999 | Bojeryd |
| 5,949,564 A | 9/1999 | Wake |
| 5,959,531 A | 9/1999 | Gallagher, III et al. |
| 5,960,344 A | 9/1999 | Mahany |
| 5,969,837 A | 10/1999 | Farber et al. |
| 5,982,413 A | 11/1999 | Irie et al. |
| 5,983,070 A | 11/1999 | Georges et al. |
| 5,987,303 A | 11/1999 | Dutta et al. |
| 6,005,884 A | 12/1999 | Cook et al. |
| 6,006,105 A | 12/1999 | Rostoker et al. |
| 6,014,546 A | 1/2000 | Georges et al. |
| 6,016,426 A | 1/2000 | Bodell |
| 6,023,625 A | 2/2000 | Myers, Jr. |
| 6,046,992 A | 4/2000 | Meier et al. |
| 6,067,053 A | 5/2000 | Runyon et al. |
| 6,078,622 A | 6/2000 | Boytim et al. |
| 6,088,381 A | 7/2000 | Myers, Jr. |
| 6,112,086 A | 8/2000 | Wala |
| 6,124,957 A | 9/2000 | Goel et al. |
| 6,127,917 A | 10/2000 | Tuttle |
| 6,128,470 A | 10/2000 | Naidu et al. |
| 6,148,041 A | 11/2000 | Dent |
| 6,150,921 A | 11/2000 | Werb et al. |
| 6,157,810 A | 12/2000 | Georges et al. |
| 6,219,553 B1 | 4/2001 | Panasik |
| 6,222,503 B1 | 4/2001 | Gietema et al. |
| 6,223,021 B1 | 4/2001 | Silvia et al. |
| 6,232,870 B1 | 5/2001 | Garber et al. |
| 6,236,789 B1 | 5/2001 | Fitz |
| 6,240,274 B1 | 5/2001 | Izadpanah |
| 6,268,946 B1 | 7/2001 | Larkin et al. |
| 6,292,673 B1 | 9/2001 | Maeda et al. |
| 6,301,240 B1 | 10/2001 | Slabinski et al. |
| 6,314,163 B1 | 11/2001 | Acampora |
| 6,317,599 B1 | 11/2001 | Rappaport et al. |
| 6,323,980 B1 | 11/2001 | Bloom |
| 6,324,391 B1 | 11/2001 | Bodell |
| 6,330,244 B1 | 12/2001 | Swartz et al. |
| 6,334,219 B1 | 12/2001 | Hill et al. |
| 6,337,754 B1 | 1/2002 | Imajo |
| 6,353,406 B1 | 3/2002 | Lanzl et al. |
| 6,353,600 B1 | 3/2002 | Schwartz et al. |
| 6,356,374 B1 | 3/2002 | Farhan |
| 6,359,714 B1 | 3/2002 | Imajo |
| 6,373,611 B1 | 4/2002 | Farhan et al. |
| 6,374,078 B1 | 4/2002 | Williams et al. |
| 6,374,124 B1 | 4/2002 | Slabinski |
| 6,374,311 B1 | 4/2002 | Mahany et al. |
| 6,389,010 B1 | 5/2002 | Kubler et al. |
| 6,392,770 B1 | 5/2002 | Sasai et al. |
| 6,405,018 B1 | 6/2002 | Reudink et al. |
| 6,405,058 B2 | 6/2002 | Bobier |
| 6,405,308 B1 | 6/2002 | Gupta et al. |
| 6,438,301 B1 | 8/2002 | Johnson et al. |
| 6,438,371 B1 | 8/2002 | Fujise et al. |
| 6,452,915 B1 | 9/2002 | Jorgensen |
| 6,477,154 B1 | 11/2002 | Cheong et al. |
| 6,480,702 B1 | 11/2002 | Sabat, Jr. |

(56) References Cited

U.S. PATENT DOCUMENTS

| | | |
|---|---|---|
| 6,486,907 B1 | 11/2002 | Farber et al. |
| 6,496,290 B1 | 12/2002 | Lee |
| 6,501,768 B2 | 12/2002 | Marin et al. |
| 6,501,942 B1 | 12/2002 | Weissman et al. |
| 6,501,965 B1 | 12/2002 | Lucidarme |
| 6,504,636 B1 | 1/2003 | Seto et al. |
| 6,512,478 B1 | 1/2003 | Chien |
| 6,519,395 B1 | 2/2003 | Bevan et al. |
| 6,523,177 B1 | 2/2003 | Brown |
| 6,525,855 B1 | 2/2003 | Westbrook et al. |
| 6,526,264 B2 | 2/2003 | Sugar et al. |
| 6,549,772 B1 | 4/2003 | Chavez et al. |
| 6,556,551 B1 | 4/2003 | Schwartz |
| 6,560,441 B1 | 5/2003 | Sabat, Jr. et al. |
| 6,577,794 B1 | 6/2003 | Currie et al. |
| 6,577,801 B2 | 6/2003 | Broderick et al. |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,594,496 B2 | 7/2003 | Schwartz |
| 6,597,325 B2 | 7/2003 | Judd et al. |
| 6,606,430 B2 | 8/2003 | Bartur et al. |
| 6,615,074 B2 | 9/2003 | Mickle et al. |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,670,930 B2 | 12/2003 | Navarro |
| 6,675,294 B1 | 1/2004 | Gupta et al. |
| 6,687,437 B1 | 2/2004 | Starnes et al. |
| 6,690,328 B2 | 2/2004 | Judd |
| 6,697,603 B1 | 2/2004 | Lovinggood et al. |
| 6,704,298 B1 | 3/2004 | Matsumiya et al. |
| 6,704,545 B1 | 3/2004 | Wala |
| 6,704,579 B2 | 3/2004 | Woodhead et al. |
| 6,710,366 B1 | 3/2004 | Lee et al. |
| 6,731,880 B2 | 5/2004 | Westbrook et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,826,164 B2 | 11/2004 | Mani et al. |
| 6,826,165 B2 | 11/2004 | Meier et al. |
| 6,826,337 B2 | 11/2004 | Linnell |
| 6,831,901 B2 | 12/2004 | Millar |
| 6,842,433 B2 | 1/2005 | West et al. |
| 6,842,459 B1 | 1/2005 | Binder |
| 6,847,856 B1 | 1/2005 | Bohannon |
| 6,850,510 B2 | 2/2005 | Kubler et al. |
| 6,865,390 B2 | 3/2005 | Goss et al. |
| 6,873,823 B2 | 3/2005 | Hasarchi et al. |
| 6,876,056 B2 | 4/2005 | Tilmans et al. |
| 6,876,852 B1 | 4/2005 | Li et al. |
| 6,879,290 B1 | 4/2005 | Toutain et al. |
| 6,882,833 B2 | 4/2005 | Nguyen |
| 6,883,710 B2 | 4/2005 | Chung |
| 6,885,846 B1 | 4/2005 | Panasik et al. |
| 6,889,060 B2 | 5/2005 | Fernando et al. |
| 6,895,185 B1 | 5/2005 | Chung et al. |
| 6,895,253 B1 | 5/2005 | Carloni et al. |
| 6,909,399 B1 | 6/2005 | Zegelin et al. |
| 6,915,058 B2 | 7/2005 | Pons |
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,933,849 B2 | 8/2005 | Sawyer |
| 6,940,916 B1 | 9/2005 | Warner et al. |
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |
| 6,965,718 B2 | 11/2005 | Koertel |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,016,308 B1 | 3/2006 | Gallagher |
| 7,020,451 B2 | 3/2006 | Sugar et al. |
| 7,020,473 B2 | 3/2006 | Splett |
| 7,024,166 B2 | 4/2006 | Wallace et al. |
| 7,035,512 B2 | 4/2006 | Van Bijsterveld |
| 7,035,671 B2 | 4/2006 | Solum |
| 7,039,399 B2 | 5/2006 | Fischer |
| 7,047,028 B2 | 5/2006 | Cagenius |
| 7,050,017 B2 | 5/2006 | King et al. |
| 7,053,838 B2 | 5/2006 | Judd |
| 7,054,513 B2 | 5/2006 | Herz et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,092,710 B1 | 8/2006 | Stoter et al. |
| 7,093,985 B2 | 8/2006 | Lord et al. |
| 7,103,312 B2 | 9/2006 | Judd et al. |
| 7,103,377 B2 | 9/2006 | Bauman et al. |
| 7,106,931 B2 | 9/2006 | Sutehall et al. |
| 7,110,381 B1 | 9/2006 | O'Sullivan et al. |
| 7,114,859 B1 | 10/2006 | Tuohimaa et al. |
| 7,127,175 B2 | 10/2006 | Mani et al. |
| 7,127,176 B2 | 10/2006 | Sasaki |
| 7,133,697 B2 | 11/2006 | Judd et al. |
| 7,142,503 B1 | 11/2006 | Grant et al. |
| 7,142,535 B2 | 11/2006 | Kubler et al. |
| 7,160,032 B2 | 1/2007 | Nagashima et al. |
| 7,181,206 B2 | 2/2007 | Pedersen |
| 7,199,443 B2 | 4/2007 | Elsharawy |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,245,603 B1 | 7/2007 | Lucidarme et al. |
| 7,257,328 B2 | 8/2007 | Levinson et al. |
| 7,263,293 B2 | 8/2007 | Ommodt et al. |
| 7,269,311 B2 | 9/2007 | Kim et al. |
| 7,277,679 B1 | 10/2007 | Barratt et al. |
| 7,286,507 B1 | 10/2007 | Oh et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,315,735 B2 | 1/2008 | Graham |
| 7,324,730 B2 | 1/2008 | Varkey et al. |
| 7,343,164 B2 | 3/2008 | Kallstenius |
| 7,349,633 B2 | 3/2008 | Lee et al. |
| 7,359,408 B2 | 4/2008 | Kim |
| 7,359,674 B2 | 4/2008 | Markki et al. |
| 7,366,150 B2 | 4/2008 | Lee et al. |
| 7,366,151 B2 | 4/2008 | Kubler et al. |
| 7,369,526 B2 | 5/2008 | Lechleider et al. |
| 7,379,669 B2 | 5/2008 | Kim |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,412,224 B2 | 8/2008 | Kotola et al. |
| 7,424,228 B1 | 9/2008 | Williams et al. |
| 7,442,679 B2 | 10/2008 | Stolte et al. |
| 7,444,051 B2 | 10/2008 | Tatat et al. |
| 7,450,853 B2 | 11/2008 | Kim et al. |

(56) References Cited

U.S. PATENT DOCUMENTS

| | | |
|---|---|---|
| 7,450,854 B2 | 11/2008 | Lee et al. |
| 7,451,365 B2 | 11/2008 | Wang et al. |
| 7,457,646 B2 | 11/2008 | Mahany et al. |
| 7,460,507 B2 | 12/2008 | Kubler et al. |
| 7,460,829 B2 | 12/2008 | Utsumi et al. |
| 7,460,831 B2 | 12/2008 | Hasarchi |
| 7,466,925 B2 | 12/2008 | Iannelli |
| 7,469,105 B2 | 12/2008 | Wake et al. |
| 7,477,597 B2 | 1/2009 | Segel |
| 7,483,504 B2 | 1/2009 | Shapira et al. |
| 7,493,129 B1 | 2/2009 | Mostafa et al. |
| 7,496,070 B2 | 2/2009 | Vesuna |
| 7,496,384 B2 | 2/2009 | Seto et al. |
| 7,522,552 B2 | 4/2009 | Fein et al. |
| 7,542,452 B2 | 6/2009 | Penumetsa |
| 7,548,695 B2 | 6/2009 | Wake |
| 7,551,641 B2 | 6/2009 | Pirzada et al. |
| 7,552,246 B2 | 6/2009 | Mahany et al. |
| 7,557,758 B2 | 7/2009 | Rofougaran |
| 7,580,384 B2 | 8/2009 | Kubler et al. |
| 7,586,861 B2 | 9/2009 | Kubler et al. |
| 7,590,354 B2 | 9/2009 | Sauer et al. |
| 7,599,420 B2 | 10/2009 | Forenza et al. |
| 7,606,594 B2 | 10/2009 | Jesse et al. |
| 7,627,250 B2 | 12/2009 | George et al. |
| 7,630,690 B2 | 12/2009 | Kaewell, Jr. et al. |
| 7,633,934 B2 | 12/2009 | Kubler et al. |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,153 B2 | 2/2010 | Zavadsky |
| 7,668,565 B2 | 2/2010 | Ylänen et al. |
| 7,684,709 B2 | 3/2010 | Ray et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,715,375 B2 | 5/2010 | Kubler et al. |
| 7,715,466 B1 | 5/2010 | Oh et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,761,093 B2 | 7/2010 | Sabat, Jr. et al. |
| 7,764,978 B1 | 7/2010 | West |
| 7,768,951 B2 | 8/2010 | Kubler et al. |
| 7,773,573 B2 | 8/2010 | Chung et al. |
| 7,778,603 B2 | 8/2010 | Palin et al. |
| 7,783,263 B2 | 8/2010 | Sperlich et al. |
| 7,787,854 B2 | 8/2010 | Conyers et al. |
| 7,805,073 B2 | 9/2010 | Sabat, Jr. et al. |
| 7,809,012 B2 | 10/2010 | Ruuska et al. |
| 7,817,958 B2 | 10/2010 | Scheinert et al. |
| 7,817,969 B2 | 10/2010 | Castaneda et al. |
| 7,835,328 B2 | 11/2010 | Stephens et al. |
| 7,844,273 B2 | 11/2010 | Scheinert |
| 7,848,316 B2 | 12/2010 | Kubler et al. |
| 7,848,731 B1 | 12/2010 | Dianda et al. |
| 7,853,234 B2 | 12/2010 | Afsahi |
| 7,870,321 B2 | 1/2011 | Rofougaran |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,916,706 B2 | 3/2011 | Kubler et al. |
| 7,917,145 B2 | 3/2011 | Mahany et al. |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,929,940 B1 | 4/2011 | Dianda et al. |
| 7,936,713 B2 | 5/2011 | Kubler et al. |
| 7,948,897 B2 | 5/2011 | Stuart et al. |
| 7,949,364 B2 | 5/2011 | Kasslin et al. |
| 7,957,777 B1 | 6/2011 | Vu et al. |
| 7,962,042 B2 | 6/2011 | Deas |
| 7,962,176 B2 | 6/2011 | Li et al. |
| 7,969,009 B2 | 6/2011 | Chandrasekaran |
| 7,969,911 B2 | 6/2011 | Mahany et al. |
| 7,990,925 B2 | 8/2011 | Tinnakornsrisuphap et al. |
| 7,996,020 B1 | 8/2011 | Chhabra |
| 8,005,152 B2 | 8/2011 | Wegener |
| 8,010,116 B2 | 8/2011 | Scheinert |
| 8,018,907 B2 | 9/2011 | Kubler et al. |
| 8,036,308 B2 | 10/2011 | Rofougaran |
| 8,082,353 B2 | 12/2011 | Huber et al. |
| 8,086,192 B2 | 12/2011 | Rofougaran et al. |
| 8,107,464 B2 | 1/2012 | Schmidt et al. |
| 8,135,102 B2 | 3/2012 | Wiwel et al. |
| 8,155,525 B2 | 4/2012 | Cox |
| 8,174,428 B2 | 5/2012 | Wegener |
| 8,208,434 B2 | 6/2012 | Sayana et al. |
| 8,213,401 B2 | 7/2012 | Fischer et al. |
| 8,270,387 B2 | 9/2012 | Cannon et al. |
| 8,274,929 B2 | 9/2012 | Schmidt et al. |
| 8,279,800 B2 | 10/2012 | Schmidt et al. |
| 8,290,483 B2 | 10/2012 | Sabat, Jr. et al. |
| 8,306,563 B2 | 11/2012 | Zavadsky et al. |
| 8,346,091 B2 | 1/2013 | Kummetz et al. |
| 8,346,160 B2 | 1/2013 | Kummetz |
| 8,346,278 B2 | 1/2013 | Wala et al. |
| 8,422,884 B2 | 4/2013 | Mao |
| 8,428,510 B2 | 4/2013 | Stratford et al. |
| 8,457,562 B2 | 6/2013 | Zavadsky et al. |
| 8,462,683 B2 | 6/2013 | Uyehara et al. |
| 8,467,823 B2 | 6/2013 | Seki et al. |
| 8,472,579 B2 | 6/2013 | Uyehara et al. |
| 8,509,215 B2 | 8/2013 | Stuart |
| 8,509,850 B2 | 8/2013 | Zavadsky et al. |
| 8,526,970 B2 | 9/2013 | Wala et al. |
| 8,532,242 B2 | 9/2013 | Fischer et al. |
| 8,532,566 B2 | 9/2013 | Dussmann |
| 8,548,526 B2 | 10/2013 | Schmidt et al. |
| 8,583,100 B2 | 11/2013 | Koziy et al. |
| 8,606,110 B2 | 12/2013 | Rospsha et al. |
| 8,626,245 B2 | 1/2014 | Zavadsky et al. |
| 8,634,766 B2 | 1/2014 | Hobbs et al. |
| 8,681,917 B2 | 3/2014 | McAllister et al. |
| 8,682,338 B2 | 3/2014 | Lemson et al. |
| 8,693,342 B2 | 4/2014 | Uyehara et al. |
| 8,694,034 B2 | 4/2014 | Notargiacomo |
| 8,699,982 B2 | 4/2014 | Singh |
| 8,737,300 B2 | 5/2014 | Stapleton et al. |
| 8,737,454 B2 | 5/2014 | Wala et al. |
| 8,743,718 B2 | 6/2014 | Grenier et al. |
| 8,743,756 B2 | 6/2014 | Uyehara et al. |
| 8,792,933 B2 | 7/2014 | Chen |
| 8,837,659 B2 | 9/2014 | Uyehara et al. |
| 8,837,940 B2 | 9/2014 | Smith et al. |
| 8,908,607 B2 | 12/2014 | Kummetz et al. |
| 8,929,288 B2 | 1/2015 | Stewart et al. |
| 8,948,816 B2 | 2/2015 | Fischer et al. |
| 8,958,789 B2 | 2/2015 | Bauman et al. |
| 8,976,067 B2 | 3/2015 | Fischer |
| 9,001,811 B2 | 4/2015 | Wala et al. |
| 9,037,143 B2 | 5/2015 | Berlin et al. |
| 9,042,732 B2 | 5/2015 | Cune et al. |
| 9,270,374 B2 | 2/2016 | Cune et al. |
| 9,325,429 B2 | 4/2016 | Berlin et al. |
| 9,525,488 B2 | 12/2016 | Beamon et al. |
| 9,602,176 B2 | 3/2017 | Schmid et al. |
| 9,642,102 B2 | 5/2017 | Machida |
| 9,806,797 B2 | 10/2017 | Berlin et al. |
| 2001/0000621 A1 | 5/2001 | Mitsuda et al. |
| 2001/0036163 A1 | 11/2001 | Sabat, Jr. et al. |
| 2001/0053011 A1 | 12/2001 | Imajo |
| 2002/0003645 A1 | 1/2002 | Kim et al. |
| 2002/0012336 A1 | 1/2002 | Hughes et al. |
| 2002/0012495 A1 | 1/2002 | Sasai et al. |
| 2002/0031113 A1 | 3/2002 | Dodds et al. |
| 2002/0048071 A1 | 4/2002 | Suzuki et al. |
| 2002/0055371 A1 | 5/2002 | Arnon et al. |
| 2002/0075906 A1 | 6/2002 | Cole et al. |
| 2002/0090915 A1 | 7/2002 | Komara et al. |
| 2002/0092347 A1 | 7/2002 | Niekerk et al. |
| 2002/0111149 A1 | 8/2002 | Shoki |

(56) References Cited

U.S. PATENT DOCUMENTS

| | | |
|---|---|---|
| 2002/0111192 A1 | 8/2002 | Thomas et al. |
| 2002/0114038 A1 | 8/2002 | Arnon et al. |
| 2002/0123365 A1 | 9/2002 | Thorson et al. |
| 2002/0126967 A1 | 9/2002 | Panak et al. |
| 2002/0130778 A1 | 9/2002 | Nicholson |
| 2002/0176354 A1 | 11/2002 | Chiodini |
| 2002/0181668 A1 | 12/2002 | Masoian et al. |
| 2002/0190845 A1 | 12/2002 | Moore |
| 2003/0007214 A1 | 1/2003 | Aburakawa et al. |
| 2003/0016418 A1 | 1/2003 | Westbrook et al. |
| 2003/0045284 A1 | 3/2003 | Copley et al. |
| 2003/0078052 A1 | 4/2003 | Atias et al. |
| 2003/0078074 A1 | 4/2003 | Sesay et al. |
| 2003/0141962 A1 | 7/2003 | Barink |
| 2003/0161637 A1 | 8/2003 | Yamamoto et al. |
| 2003/0165287 A1 | 9/2003 | Krill et al. |
| 2003/0174099 A1 | 9/2003 | Bauer et al. |
| 2003/0209601 A1 | 11/2003 | Chung |
| 2004/0001719 A1 | 1/2004 | Sasaki |
| 2004/0008114 A1 | 1/2004 | Sawyer |
| 2004/0017785 A1 | 1/2004 | Zelst |
| 2004/0037300 A1 | 2/2004 | Lehr et al. |
| 2004/0041714 A1 | 3/2004 | Forster |
| 2004/0043764 A1 | 3/2004 | Bigham et al. |
| 2004/0047313 A1 | 3/2004 | Rumpf et al. |
| 2004/0049321 A1 | 3/2004 | Lehr et al. |
| 2004/0078151 A1 | 4/2004 | Aljadeff et al. |
| 2004/0100930 A1 | 5/2004 | Shapira et al. |
| 2004/0105435 A1 | 6/2004 | Morioka |
| 2004/0106435 A1 | 6/2004 | Bauman et al. |
| 2004/0110469 A1 | 6/2004 | Judd et al. |
| 2004/0126068 A1 | 7/2004 | Van Bijsterveld |
| 2004/0131125 A1 | 7/2004 | Sanderford, Jr. et al. |
| 2004/0146020 A1 | 7/2004 | Kubler et al. |
| 2004/0149736 A1 | 8/2004 | Clothier |
| 2004/0151164 A1 | 8/2004 | Kubler et al. |
| 2004/0151503 A1 | 8/2004 | Kashima et al. |
| 2004/0157623 A1 | 8/2004 | Splett |
| 2004/0160912 A1 | 8/2004 | Kubler et al. |
| 2004/0160913 A1 | 8/2004 | Kubler et al. |
| 2004/0162115 A1 | 8/2004 | Smith et al. |
| 2004/0162116 A1 | 8/2004 | Han et al. |
| 2004/0165573 A1 | 8/2004 | Kubler et al. |
| 2004/0175173 A1 | 9/2004 | Deas |
| 2004/0175177 A1 | 9/2004 | Lee et al. |
| 2004/0198451 A1 | 10/2004 | Varghese |
| 2004/0202257 A1 | 10/2004 | Mehta et al. |
| 2004/0203339 A1 | 10/2004 | Bauman |
| 2004/0203704 A1 | 10/2004 | Ommodt et al. |
| 2004/0203846 A1 | 10/2004 | Caronni et al. |
| 2004/0204109 A1 | 10/2004 | Hoppenstein |
| 2004/0208526 A1 | 10/2004 | Mibu |
| 2004/0218873 A1 | 11/2004 | Nagashima et al. |
| 2004/0230846 A1 | 11/2004 | Mancey et al. |
| 2004/0233877 A1 | 11/2004 | Lee et al. |
| 2004/0258105 A1 | 12/2004 | Spathas et al. |
| 2005/0052287 A1 | 3/2005 | Whitesmith et al. |
| 2005/0058451 A1 | 3/2005 | Ross |
| 2005/0068179 A1 | 3/2005 | Roesner |
| 2005/0076982 A1 | 4/2005 | Metcalf et al. |
| 2005/0078006 A1 | 4/2005 | Hutchins et al. |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0141545 A1 | 6/2005 | Fein et al. |
| 2005/0143077 A1 | 6/2005 | Charbonneau |
| 2005/0147071 A1 | 7/2005 | Karaoguz et al. |
| 2005/0148306 A1 | 7/2005 | Hiddink |
| 2005/0159108 A1 | 7/2005 | Fletcher et al. |
| 2005/0174236 A1 | 8/2005 | Brookner |
| 2005/0201761 A1 | 9/2005 | Bartur et al. |
| 2005/0219050 A1 | 10/2005 | Martin |
| 2005/0220458 A1 | 10/2005 | Kupershmidt et al. |
| 2005/0224585 A1 | 10/2005 | Durrant et al. |
| 2005/0226625 A1 | 10/2005 | Wake et al. |
| 2005/0232636 A1 | 10/2005 | Durrant et al. |
| 2005/0242188 A1 | 11/2005 | Vesuna |
| 2005/0252971 A1 | 11/2005 | Howarth et al. |
| 2005/0266797 A1 | 12/2005 | Utsumi et al. |
| 2005/0266854 A1 | 12/2005 | Niiho et al. |
| 2005/0269930 A1 | 12/2005 | Shimizu et al. |
| 2005/0271396 A1 | 12/2005 | Iannelli |
| 2006/0002326 A1 | 1/2006 | Vesuna |
| 2006/0014548 A1 | 1/2006 | Bolin et al. |
| 2006/0017633 A1 | 1/2006 | Pronkine |
| 2006/0019604 A1 | 1/2006 | Hasarchi |
| 2006/0045054 A1 | 3/2006 | Utsumi et al. |
| 2006/0053324 A1 | 3/2006 | Giat et al. |
| 2006/0062579 A1 | 3/2006 | Kim et al. |
| 2006/0079290 A1 | 4/2006 | Seto et al. |
| 2006/0094470 A1 | 5/2006 | Wake et al. |
| 2006/0104643 A1 | 5/2006 | Lee et al. |
| 2006/0159388 A1 | 7/2006 | Kawase et al. |
| 2006/0182446 A1 | 8/2006 | Kim et al. |
| 2006/0182449 A1 | 8/2006 | Iannelli et al. |
| 2006/0189354 A1 | 8/2006 | Lee et al. |
| 2006/0222369 A1 | 10/2006 | Kim et al. |
| 2006/0233506 A1 | 10/2006 | Noonan et al. |
| 2006/0239630 A1 | 10/2006 | Hase et al. |
| 2006/0267843 A1 | 11/2006 | Sakama et al. |
| 2006/0274704 A1 | 12/2006 | Desai et al. |
| 2007/0008939 A1 | 1/2007 | Fischer |
| 2007/0009266 A1 | 1/2007 | Bothwell et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0076649 A1 | 4/2007 | Lin et al. |
| 2007/0093273 A1 | 4/2007 | Cai |
| 2007/0149250 A1 | 6/2007 | Crozzoli et al. |
| 2007/0157251 A1 | 7/2007 | Shrivastava et al. |
| 2007/0166042 A1 | 7/2007 | Seeds et al. |
| 2007/0208961 A1 | 9/2007 | Ghoshal et al. |
| 2007/0224954 A1 | 9/2007 | Gopi |
| 2007/0243899 A1 | 10/2007 | Hermel et al. |
| 2007/0248358 A1 | 10/2007 | Sauer |
| 2007/0253714 A1 | 11/2007 | Seeds et al. |
| 2007/0257796 A1 | 11/2007 | Easton et al. |
| 2007/0264009 A1 | 11/2007 | Sabat, Jr. et al. |
| 2007/0274279 A1 | 11/2007 | Wood et al. |
| 2007/0285239 A1 | 12/2007 | Easton et al. |
| 2007/0286599 A1 | 12/2007 | Sauer et al. |
| 2007/0297005 A1 | 12/2007 | Montierth et al. |
| 2008/0007453 A1 | 1/2008 | Vassilakis et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0014992 A1 | 1/2008 | Pescod et al. |
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0043784 A1 | 2/2008 | Wilcox |
| 2008/0044186 A1 | 2/2008 | George et al. |
| 2008/0056167 A1 | 3/2008 | Kim et al. |
| 2008/0058018 A1 | 3/2008 | Scheinert |
| 2008/0063387 A1 | 3/2008 | Yahata et al. |
| 2008/0080863 A1 | 4/2008 | Sauer et al. |
| 2008/0098203 A1 | 4/2008 | Master et al. |
| 2008/0118014 A1 | 5/2008 | Reunamaki et al. |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0129634 A1 | 6/2008 | Pera et al. |
| 2008/0134194 A1 | 6/2008 | Liu |
| 2008/0145061 A1 | 6/2008 | Lee et al. |
| 2008/0150514 A1 | 6/2008 | Codreanu et al. |
| 2008/0159226 A1 | 7/2008 | He et al. |
| 2008/0159744 A1 | 7/2008 | Soto et al. |
| 2008/0165720 A1 | 7/2008 | Hu et al. |
| 2008/0166094 A1 | 7/2008 | Bookbinder et al. |
| 2008/0168283 A1 | 7/2008 | Penning |
| 2008/0181282 A1 | 7/2008 | Wala et al. |
| 2008/0194226 A1 | 8/2008 | Rivas et al. |

(56) References Cited

U.S. PATENT DOCUMENTS

| | | |
|---|---|---|
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232799 A1 | 9/2008 | Kim |
| 2008/0247716 A1 | 10/2008 | Thomas et al. |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0261656 A1 | 10/2008 | Bella et al. |
| 2008/0268833 A1 | 10/2008 | Huang et al. |
| 2008/0273844 A1 | 11/2008 | Kewitsch |
| 2008/0279137 A1 | 11/2008 | Pernu et al. |
| 2008/0279299 A1 | 11/2008 | Reuven et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0298813 A1 | 12/2008 | Song et al. |
| 2008/0304831 A1 | 12/2008 | Miller, II et al. |
| 2008/0310848 A1 | 12/2008 | Yasuda et al. |
| 2008/0311944 A1 | 12/2008 | Hansen et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0073916 A1 | 3/2009 | Zhang et al. |
| 2009/0081985 A1 | 3/2009 | Rofougaran et al. |
| 2009/0086693 A1 | 4/2009 | Kennedy |
| 2009/0087181 A1 | 4/2009 | Gray |
| 2009/0088072 A1 | 4/2009 | Rofougaran et al. |
| 2009/0092394 A1 | 4/2009 | Wei et al. |
| 2009/0097855 A1 | 4/2009 | Thelen et al. |
| 2009/0135078 A1 | 5/2009 | Lindmark et al. |
| 2009/0149221 A1 | 6/2009 | Liu et al. |
| 2009/0154621 A1 | 6/2009 | Shapira et al. |
| 2009/0169163 A1 | 7/2009 | Abbott, III et al. |
| 2009/0175214 A1 | 7/2009 | Sfar et al. |
| 2009/0180407 A1 | 7/2009 | Sabat et al. |
| 2009/0180423 A1 | 7/2009 | Kroener |
| 2009/0180426 A1 | 7/2009 | Sabat et al. |
| 2009/0218407 A1 | 9/2009 | Rofougaran |
| 2009/0218657 A1 | 9/2009 | Rofougaran |
| 2009/0221249 A1 | 9/2009 | Aue et al. |
| 2009/0238307 A1 | 9/2009 | Singh |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0252136 A1 | 10/2009 | Mahany et al. |
| 2009/0252204 A1 | 10/2009 | Shatara et al. |
| 2009/0252205 A1 | 10/2009 | Rheinfelder et al. |
| 2009/0258652 A1 | 10/2009 | Lambert et al. |
| 2009/0285147 A1 | 11/2009 | Subasic et al. |
| 2009/0290632 A1 | 11/2009 | Wegener |
| 2009/0316609 A1 | 12/2009 | Singh |
| 2010/0002626 A1 | 1/2010 | Schmidt et al. |
| 2010/0002661 A1 | 1/2010 | Schmidt et al. |
| 2010/0009394 A1 | 1/2010 | Guo |
| 2010/0009694 A1 | 1/2010 | Fischer |
| 2010/0027443 A1 | 2/2010 | LoGalbo et al. |
| 2010/0054227 A1 | 3/2010 | Hettstedt et al. |
| 2010/0056200 A1 | 3/2010 | Tolonen |
| 2010/0067426 A1 | 3/2010 | Voschina et al. |
| 2010/0067906 A1 | 3/2010 | Adhikari et al. |
| 2010/0080154 A1 | 4/2010 | Noh et al. |
| 2010/0080182 A1 | 4/2010 | Kubler et al. |
| 2010/0083330 A1 | 4/2010 | Bernstein et al. |
| 2010/0087227 A1 | 4/2010 | Francos et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0144337 A1 | 6/2010 | Dean |
| 2010/0148373 A1 | 6/2010 | Chandrasekaran |
| 2010/0150034 A1 | 6/2010 | Song et al. |
| 2010/0156721 A1 | 6/2010 | Alamouti et al. |
| 2010/0177759 A1 | 7/2010 | Fischer et al. |
| 2010/0177760 A1 | 7/2010 | Cannon et al. |
| 2010/0188998 A1 | 7/2010 | Pernu et al. |
| 2010/0189439 A1 | 7/2010 | Novak et al. |
| 2010/0190509 A1 | 7/2010 | Davis |
| 2010/0196013 A1 | 8/2010 | Franklin |
| 2010/0202326 A1 | 8/2010 | Rofougaran et al. |
| 2010/0202356 A1 | 8/2010 | Fischer et al. |
| 2010/0208777 A1 | 8/2010 | Ogaz |
| 2010/0215028 A1 | 8/2010 | Fischer |
| 2010/0225413 A1 | 9/2010 | Rofougaran et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0278530 A1 | 11/2010 | Kummetz et al. |
| 2010/0290355 A1 | 11/2010 | Roy et al. |
| 2010/0290787 A1 | 11/2010 | Cox |
| 2010/0291949 A1 | 11/2010 | Shapira et al. |
| 2010/0296458 A1 | 11/2010 | Wala et al. |
| 2010/0296816 A1 | 11/2010 | Larsen |
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0316609 A1 | 12/2010 | Dewhurst et al. |
| 2010/0329161 A1 | 12/2010 | Ylanen et al. |
| 2010/0329166 A1 | 12/2010 | Mahany et al. |
| 2011/0007724 A1 | 1/2011 | Mahany et al. |
| 2011/0007733 A1 | 1/2011 | Kubler et al. |
| 2011/0008042 A1 | 1/2011 | Stewart |
| 2011/0021146 A1 | 1/2011 | Pernu |
| 2011/0021224 A1 | 1/2011 | Koskinen et al. |
| 2011/0045767 A1 | 2/2011 | Rofougaran et al. |
| 2011/0055875 A1 | 3/2011 | Zussman |
| 2011/0065450 A1 | 3/2011 | Kazmi |
| 2011/0069668 A1 | 3/2011 | Chion et al. |
| 2011/0070821 A1 | 3/2011 | Chun et al. |
| 2011/0071734 A1 | 3/2011 | Van Wiemeersch et al. |
| 2011/0086614 A1 | 4/2011 | Brisebois et al. |
| 2011/0105016 A1 | 5/2011 | Saito et al. |
| 2011/0116393 A1 | 5/2011 | Hong et al. |
| 2011/0116572 A1 | 5/2011 | Lee et al. |
| 2011/0126071 A1 | 5/2011 | Han et al. |
| 2011/0135308 A1 | 6/2011 | Tarlazzi et al. |
| 2011/0141895 A1 | 6/2011 | Zhang |
| 2011/0149879 A1 | 6/2011 | Noriega et al. |
| 2011/0158297 A1 | 6/2011 | Ding et al. |
| 2011/0158298 A1 | 6/2011 | Djadi et al. |
| 2011/0170577 A1 | 7/2011 | Anvari |
| 2011/0170619 A1 | 7/2011 | Anvari |
| 2011/0182230 A1 | 7/2011 | Ohm et al. |
| 2011/0182255 A1 | 7/2011 | Kim et al. |
| 2011/0194475 A1 | 8/2011 | Kim et al. |
| 2011/0201368 A1 | 8/2011 | Faccin et al. |
| 2011/0204504 A1 | 8/2011 | Henderson et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0223958 A1 | 9/2011 | Chen et al. |
| 2011/0223959 A1 | 9/2011 | Chen |
| 2011/0223960 A1 | 9/2011 | Chen et al. |
| 2011/0223961 A1 | 9/2011 | Chen et al. |
| 2011/0227795 A1 | 9/2011 | Lopez et al. |
| 2011/0236024 A1 | 9/2011 | Mao |
| 2011/0237178 A1 | 9/2011 | Seki et al. |
| 2011/0241881 A1 | 10/2011 | Badinelli |
| 2011/0243201 A1 | 10/2011 | Phillips et al. |
| 2011/0243291 A1 | 10/2011 | McAllister et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |

(56) References Cited

U.S. PATENT DOCUMENTS

| | | |
|---|---|---|
| 2011/0268446 A1 | 11/2011 | Cune et al. |
| 2011/0268449 A1 | 11/2011 | Berlin et al. |
| 2011/0268452 A1 | 11/2011 | Beamon et al. |
| 2011/0274021 A1 | 11/2011 | He et al. |
| 2011/0281536 A1 | 11/2011 | Lee et al. |
| 2011/0316755 A1 | 12/2011 | Ayatollahi et al. |
| 2012/0106657 A1 | 5/2012 | Fischer et al. |
| 2012/0139793 A1 | 6/2012 | Sharawi |
| 2012/0140690 A1 | 6/2012 | Choi et al. |
| 2012/0177026 A1 | 7/2012 | Uyehara et al. |
| 2012/0263098 A1 | 10/2012 | Takahashi et al. |
| 2012/0296816 A1 | 11/2012 | Kim et al. |
| 2012/0307719 A1 | 12/2012 | Nakasato |
| 2012/0314797 A1 | 12/2012 | Kummetz et al. |
| 2012/0314813 A1 | 12/2012 | Loyez et al. |
| 2012/0322477 A1 | 12/2012 | Kang et al. |
| 2013/0012195 A1 | 1/2013 | Sabat, Jr. et al. |
| 2013/0017863 A1 | 1/2013 | Kummetz et al. |
| 2013/0034358 A1 | 2/2013 | Sung et al. |
| 2013/0040676 A1 | 2/2013 | Kang et al. |
| 2013/0089336 A1 | 4/2013 | Dahlfort et al. |
| 2013/0095870 A1 | 4/2013 | Phillips et al. |
| 2013/0107763 A1* | 5/2013 | Uyehara ............... H04B 7/024 370/278 |
| 2013/0114963 A1 | 5/2013 | Stapleton et al. |
| 2013/0121703 A1 | 5/2013 | Kummetz et al. |
| 2013/0150063 A1 | 6/2013 | Berlin et al. |
| 2013/0188753 A1 | 7/2013 | Tarlazzi et al. |
| 2013/0188959 A1 | 7/2013 | Cune et al. |
| 2013/0195467 A1 | 8/2013 | Schmid et al. |
| 2013/0210490 A1 | 8/2013 | Fischer et al. |
| 2013/0236180 A1 | 9/2013 | Kim et al. |
| 2013/0272202 A1 | 10/2013 | Stapleton et al. |
| 2013/0330086 A1 | 12/2013 | Berlin et al. |
| 2014/0006931 A1 | 1/2014 | Pettitt et al. |
| 2014/0016583 A1 | 1/2014 | Smith |
| 2014/0036770 A1 | 2/2014 | Stapleton et al. |
| 2014/0050482 A1 | 2/2014 | Berlin et al. |
| 2014/0050483 A1 | 2/2014 | Berlin et al. |
| 2014/0057627 A1 | 2/2014 | Hejazi et al. |
| 2014/0069318 A1 | 3/2014 | Johnson et al. |
| 2014/0079112 A1 | 3/2014 | Ranson et al. |
| 2014/0105056 A1 | 4/2014 | Li et al. |
| 2014/0112667 A1 | 4/2014 | Neukirch et al. |
| 2014/0140225 A1 | 5/2014 | Wala |
| 2014/0146797 A1 | 5/2014 | Zavadsky et al. |
| 2014/0146905 A1 | 5/2014 | Zavadsky et al. |
| 2014/0146906 A1 | 5/2014 | Zavadsky et al. |
| 2014/0150063 A1 | 5/2014 | Bone |
| 2014/0204900 A1 | 7/2014 | Kawasaki |
| 2014/0219140 A1 | 8/2014 | Uyehara et al. |
| 2014/0241224 A1 | 8/2014 | Fischer et al. |
| 2014/0243033 A1 | 8/2014 | Wala et al. |
| 2014/0248050 A1 | 9/2014 | Crilly, Jr. et al. |
| 2014/0269318 A1 | 9/2014 | Hasarchi et al. |
| 2014/0269859 A1 | 9/2014 | Hanson et al. |
| 2014/0286643 A1 | 9/2014 | George et al. |
| 2014/0287677 A1 | 9/2014 | Machida |
| 2014/0308043 A1 | 10/2014 | Heidler et al. |
| 2014/0308044 A1 | 10/2014 | Heidler et al. |
| 2014/0314061 A1 | 10/2014 | Trajkovic et al. |
| 2015/0049663 A1 | 2/2015 | Mukherjee et al. |
| 2015/0098351 A1 | 4/2015 | Zavadsky et al. |
| 2015/0098372 A1 | 4/2015 | Zavadsky et al. |
| 2015/0098419 A1 | 4/2015 | Zavadsky et al. |
| 2015/0155942 A1 | 6/2015 | Baker et al. |
| 2015/0180575 A1 | 6/2015 | Bruckman |
| 2015/0382292 A1 | 12/2015 | Heidler et al. |
| 2016/0013844 A1 | 1/2016 | Berlin et al. |
| 2016/0036505 A1 | 2/2016 | George et al. |
| 2016/0080082 A1 | 3/2016 | Lemson et al. |
| 2016/0087724 A1 | 3/2016 | Liu et al. |
| 2016/0173201 A1 | 6/2016 | Cune et al. |
| 2016/0204878 A1 | 7/2016 | Goodwill |
| 2016/0219591 A1 | 7/2016 | Lee et al. |
| 2016/0295565 A1 | 10/2016 | Kim et al. |
| 2017/0047998 A1 | 2/2017 | Palanisamy et al. |
| 2017/0201322 A1 | 7/2017 | Harel et al. |
| 2017/0207548 A1 | 7/2017 | Schwartzman et al. |
| 2017/0207853 A1 | 7/2017 | Harel et al. |
| 2017/0244541 A1 | 8/2017 | McAllister et al. |

FOREIGN PATENT DOCUMENTS

| | | |
|---|---|---|
| CA | 2065090 C | 2/1998 |
| CA | 2242707 C | 9/2002 |
| CA | 2815509 C | 3/2015 |
| CN | 1745560 A | 3/2006 |
| CN | 101076961 A | 11/2007 |
| CN | 101090299 A | 12/2007 |
| CN | 101151811 A | 3/2008 |
| CN | 101296525 A | 10/2008 |
| CN | 101346006 A | 1/2009 |
| CN | 101496306 A | 7/2009 |
| CN | 101542928 A | 9/2009 |
| CN | 201315588 Y | 9/2009 |
| DE | 19705253 A1 | 8/1998 |
| DE | 20104862 U1 | 9/2001 |
| DE | 10249414 A1 | 5/2004 |
| EP | 0391597 A2 | 10/1990 |
| EP | 0461583 A1 | 12/1991 |
| EP | 0477952 A2 | 4/1992 |
| EP | 0477952 A3 | 4/1992 |
| EP | 0714218 A1 | 5/1996 |
| EP | 0766343 A2 | 4/1997 |
| EP | 0687400 B1 | 11/1998 |
| EP | 0993124 A2 | 4/2000 |
| EP | 1056226 A2 | 11/2000 |
| EP | 1173034 A1 | 1/2002 |
| EP | 1202475 A2 | 5/2002 |
| EP | 1227605 A2 | 7/2002 |
| EP | 1267447 A1 | 12/2002 |
| EP | 1347584 A2 | 9/2003 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1511203 A1 | 3/2005 |
| EP | 1530316 A1 | 5/2005 |
| EP | 1267447 B1 | 8/2006 |
| EP | 1693974 A1 | 8/2006 |
| EP | 1742388 A1 | 1/2007 |
| EP | 1173034 B1 | 7/2007 |
| EP | 1954019 A1 | 8/2008 |
| EP | 1968250 A1 | 9/2008 |
| EP | 1357683 B1 | 5/2009 |
| EP | 2110955 A1 | 10/2009 |
| EP | 2253980 A1 | 11/2010 |
| EP | 1570626 B1 | 11/2013 |
| GB | 2323252 A | 9/1998 |
| GB | 2366131 A | 2/2002 |
| GB | 2370170 A | 6/2002 |
| GB | 2399963 A | 9/2004 |
| GB | 2428149 A | 1/2007 |
| JP | 05260018 A | 10/1993 |
| JP | 08181661 A | 7/1996 |
| JP | 09083450 A | 3/1997 |
| JP | 09162810 A | 6/1997 |
| JP | 09200840 A | 7/1997 |
| JP | 11068675 A | 3/1999 |
| JP | 11088265 A | 3/1999 |
| JP | 2000152300 A | 5/2000 |
| JP | 2000341744 A | 12/2000 |
| JP | 2002264617 A | 9/2002 |
| JP | 2003148653 A | 5/2003 |
| JP | 2003172827 A | 6/2003 |
| JP | 2004172734 A | 6/2004 |
| JP | 2004245963 A | 9/2004 |
| JP | 2004247090 A | 9/2004 |
| JP | 2004264901 A | 9/2004 |
| JP | 2004265624 A | 9/2004 |
| JP | 2004317737 A | 11/2004 |

(56) References Cited

FOREIGN PATENT DOCUMENTS

| | | |
|---|---|---|
| JP | 2004349184 A | 12/2004 |
| JP | 2005018175 A | 1/2005 |
| JP | 2005087135 A | 4/2005 |
| JP | 2005134125 A | 5/2005 |
| JP | 2007228603 A | 9/2007 |
| JP | 2008172597 A | 7/2008 |
| KR | 20040053467 A | 6/2004 |
| KR | 20110087949 A | 8/2011 |
| KR | 2012035459 A | 4/2012 |
| WO | 9603823 A1 | 2/1996 |
| WO | 9748197 A2 | 12/1997 |
| WO | 9935788 A2 | 7/1999 |
| WO | 0042721 A1 | 7/2000 |
| WO | 2007075579 A2 | 7/2001 |
| WO | 0178434 A1 | 10/2001 |
| WO | 0184760 A1 | 11/2001 |
| WO | 0221183 A1 | 3/2002 |
| WO | 0230141 A1 | 4/2002 |
| WO | 02102102 A1 | 12/2002 |
| WO | 03024027 A1 | 3/2003 |
| WO | 03024127 A1 | 3/2003 |
| WO | 03098175 A1 | 11/2003 |
| WO | 2004030154 A2 | 4/2004 |
| WO | 2004047472 A1 | 6/2004 |
| WO | 2004056019 A1 | 7/2004 |
| WO | 2004059934 A1 | 7/2004 |
| WO | 2004086795 A2 | 10/2004 |
| WO | 2004093471 A2 | 10/2004 |
| WO | 2005062505 A1 | 7/2005 |
| WO | 2005069203 A2 | 7/2005 |
| WO | 2005069203 A3 | 7/2005 |
| WO | 2005073897 A1 | 8/2005 |
| WO | 2005079386 A2 | 9/2005 |
| WO | 2005101701 A2 | 10/2005 |
| WO | 2005111959 A2 | 11/2005 |
| WO | 2005117337 A1 | 12/2005 |
| WO | 2006011778 A1 | 2/2006 |
| WO | 2006018592 A1 | 2/2006 |
| WO | 2006019392 A1 | 2/2006 |
| WO | 2006039941 A1 | 4/2006 |
| WO | 2006046088 A1 | 5/2006 |
| WO | 2006051262 A1 | 5/2006 |
| WO | 2006077569 A1 | 7/2006 |
| WO | 2006094441 A1 | 9/2006 |
| WO | 2006133609 A1 | 12/2006 |
| WO | 2006136811 A1 | 12/2006 |
| WO | 2007048427 A1 | 5/2007 |
| WO | 2007077451 A1 | 7/2007 |
| WO | 2007088561 A1 | 8/2007 |
| WO | 2007091026 A1 | 8/2007 |
| WO | 2008008249 A2 | 1/2008 |
| WO | 2008027213 A2 | 3/2008 |
| WO | 2008033298 A2 | 3/2008 |
| WO | 2008039830 A2 | 4/2008 |
| WO | 2009014710 A1 | 1/2009 |
| WO | 2009100395 A1 | 8/2009 |
| WO | 2009100396 A1 | 8/2009 |
| WO | 2009100397 A2 | 8/2009 |
| WO | 2009100398 A2 | 8/2009 |
| WO | 2009145789 A1 | 12/2009 |
| WO | 2010087919 A2 | 8/2010 |
| WO | 2010090999 A1 | 8/2010 |
| WO | 2011043172 A1 | 4/2011 |
| WO | 2011112373 A1 | 9/2011 |
| WO | 2011139937 A1 | 11/2011 |
| WO | 2011139939 A1 | 11/2011 |
| WO | 2011139942 A1 | 11/2011 |
| WO | 2011160117 A1 | 12/2011 |
| WO | 2012024345 A2 | 2/2012 |
| WO | 2012051227 A1 | 4/2012 |
| WO | 2012051230 A1 | 4/2012 |
| WO | 2012054553 A1 | 4/2012 |
| WO | 2012058182 A1 | 5/2012 |
| WO | 2012100468 A1 | 8/2012 |
| WO | 2012170865 A2 | 12/2012 |
| WO | 2013009835 A1 | 1/2013 |
| WO | 2013063025 A1 | 5/2013 |
| WO | 2013122915 A1 | 8/2013 |
| WO | 2014022211 A2 | 2/2014 |
| WO | 2014070236 A1 | 5/2014 |
| WO | 2014082070 A1 | 5/2014 |
| WO | 2014082072 A1 | 5/2014 |
| WO | 2014082075 A1 | 5/2014 |
| WO | 2014144314 A1 | 9/2014 |
| WO | 2015054162 A1 | 4/2015 |
| WO | 2015054164 A1 | 4/2015 |
| WO | 2015054165 A1 | 4/2015 |

OTHER PUBLICATIONS

Notice of Allowance for U.S. Appl. No. 14/664,305, dated Dec. 1, 2017, 19 pages.
Final Office Action for U.S. Appl. No. 14/711,306 dated Jul. 9, 2015, 16 pages.
Advisory Action for U.S. Appl. No. 13/967,426 dated Jul. 6, 2015, 3 pages.
Examination Report for European patent application 11721160.7 dated Oct. 21, 2015, 7 pages.
Translation of the Second Office Action for Chinese patent application 201180024499.4 dated Aug. 17, 2015, 3 pages.
Advisory Action for U.S. Appl. No. 14/711,306 dated Oct. 8, 2015, 3 pages.
Non-final Office Action for U.S. Appl. No. 13/967,426 dated Sep. 17, 2015, 27 pages.
Mohammed, Maalim, et al., "New Compact Design of Dual Notched Bands UWB Antenna with Slots in Radiating and Feeding Elements," IEEE Student Conference on Research and Development, Dec. 16-17, 2013, Putrajaya, Malaysia, IEEE, pp. 374-379.
International Search Report and Written Opinion for PCT/IL2015/051205 dated Mar. 10, 2016, 14 pages.
International Search Report for PCT/IL2015/051219 dated Mar. 17, 2016, 5 pages.
International Search Report and Written Opinion for PCT/IL2015/051217 dated Mar. 17, 2016, 14 pages.
International Search Report and Written Opinion for PCT/IL2015/051095 dated Mar. 2, 2016, 14 pages.
International Search Report and Written Opinion for PCT/IL2015/051061 dated Feb. 15, 2016, 12 pages.
Notice of Allowance for U.S. Appl. No. 13/025,719 dated Aug. 11, 2016, 8 pages.
Non-final Office Action for U.S. Appl. No. 14/664,305 dated Jul. 7, 2016, 45 pages.
Final Office Action for U.S. Appl. No. 14/664,305, dated Dec. 23, 2016, 24 pages.
Non-final Office Action for U.S. Appl. No. 15/049,913 dated Jun. 16, 2016, 20 pages.
Final Office Action for U.S. Appl. No. 15/049,913, dated Nov. 25, 2016, 16 pages.
Notice of Allowance and Examiner-Initiated Interview Summary for U.S. Appl. No. 15/098,941, dated Jul. 14, 2016, 18 pages.
Corrected Notice of Allowability for U.S. Appl. No. No. 15/098,941, dated Jul. 27, 2016, 5 pages.
Advisory Action for U.S. Appl. No. 15/049,913, dated Feb. 15, 2017, 3 pages.
Non-Final Office Action for U.S. Appl. No. 151381,952, dated Jan. 27, 2017, 14 pages.
International Search Report for PCT/IL2015/050970, dated May 9, 2016, 6 pages.
International Preliminary Report on Patentability for PCT/IL2015/050970, dated Apr. 6, 2017, 17 pages.
Non-Final Office Action for U.S. Appl. No. 14/496,507, dated Feb. 24, 2017, 15 pages.
Advisory Action for U.S. Appl. No. 14/664,305, dated Mar. 1, 2017, 3 pages.
Non-Final Office Action for U.S. Appl. No. 14/664,305, dated Apr. 7, 2017, 34 pages.
Non-Final Office Action for U.S. Appl. No. 15/332,505, dated Apr. 5, 2017, 24 pages.

(56) References Cited

OTHER PUBLICATIONS

Non-Final Office Action for U.S. Appl. No. 15/381,952, dated Jan. 27, 2017, 14 pages.
Author Unknown, "Fiber Optic Distributed Antenna System," Installation and Users Guide, ERAU Version 1.5, May 2002, Andrews Corporation, 53 pages.
Translation of the First Office Action for Chinese Patent Application No. 201610029179.2, dated Jul. 27, 2017, 19 pages.
Invitation to Pay Fees for International Patent Application No. PCT/IL2015/050970, dated Feb. 17, 2016, 6 pages.
Final Office Action for U.S. Appl. No. 14/664,305, dated Sep. 5, 2017, 34 pages.
Examiner's Answer to the Appeal Brief for U.S. Appl. No. 15/049,913, dated Jun. 22, 2017, 22 pages.
Notice of Allowance for U.S. Appl. No. 15/332,505, dated Aug. 31, 2017, 8 pages.
Notice of Allowance for U.S. Appl. No. 15/381,952, dated May 9, 2017, 7 pages.
Notice of Allowance for U.S. Appl. No. 15/381,952, dated Jul. 31, 2017, 7 pages.
Final Office Action for U.S. Appl. No. 14/496,507, dated Sep. 28, 2017, 21 pages.
Non-Final Office Action for U.S. Appl. No. 15/473,827, dated Sep. 22, 2017, 38 pages.
Notification of Grant for Chinese patent application 201190000473.1 dated Aug. 28, 2013, 4 pages.
International Search Report for PCT/US2011/034725 dated Aug. 5, 2011, 4 pages.
Non-final Office Action for U.S. Appl. No. 12/892,424 dated Nov. 5, 2012, 22 pages.
International Search Report and Written Opinion for PCT/US2011/034738 dated Jul. 27, 2011, 13 pages.
International Search Report for PCT/US2011/047821 dated Oct. 25, 2011, 4 pages.
International Preliminary Report on Patentability for PCT/US2011/047821 dated Feb. 19, 2013, 10 pages.
Non-final Office Action for U.S. Appl. No. 13/025,719 dated Sep. 11, 2013, 18 pages.
Parker et al., "Radio-over-fibre technologies arising from the Building the future Optical Network in Europe (BONE) project," IET Optoelectron., 2010, vol. 4, Issue 6, pp. 247-259.
Singh et al., "Distributed coordination with deaf neighbors: efficient medium access for 60 GHz mesh networks," IEEE INFOCOM 2010 proceedings, 9 pages.
Examination Report for European patent application 11754570.7 dated Nov. 18, 2013, 7 pages.
Final Office Action for U.S. Appl. No. 13/025,719 dated Dec. 31, 2013, 20 pages.
Advisory Action for U.S. Appl. No. 13/025,719 dated Mar. 14, 2014, 6 pages.
Non-final Office Action for U.S. Appl. No. 13/785,603 dated Dec. 23, 2013, 15 pages.
Final Office Action for U.S. Appl. No. 13/785,603 dated Apr. 14, 2014, 17 pages.
Advisory Action for U.S. Appl. No. 13/785,603 dated Jun. 30, 2014, 3 pages.
Non-final Office Action for U.S. Appl. No. 13/785,603 dated Sep. 9, 2014, 10 pages.
Final Office Action for U.S. Appl. No. 13/785,603 dated Dec. 4, 2014, 8 pages.
Non-final Office Action for U.S. Appl. No. 13/762,432 dated Aug. 20, 2014, 4 pages.
Notice of Allowance for U.S. Appl. No. 13/762,432 dated Dec. 24, 2014, 7 pages.
Chowdhury et al., "Multi-service Multi-carrier Broadband MIMO Distributed Antenna Systems for In-building Optical Wireless Access," Presented at the 2010 Conference on Optical Fiber Communication and National Fiber Optic Engineers Conference, Mar. 21-25, 2010, San Diego, California, IEEE, pp. 1-3.

International Search Report for PCT/US2011/055861 dated Feb. 7, 2012, 4 pages.
International Preliminary Report on Patentability for PCT/US2011/055861 dated Apr. 25, 2013, 9 pages.
International Search Report for PCT/US2011/055858 dated Feb. 7, 2012, 4 pages.
International Preliminary Report on Patentability for PCT/US2011/055858 dated Apr. 25, 2013, 8 pages.
International Search Report for PCT/US2011/034733 dated Aug. 1, 2011, 5 pages.
International Preliminary Report on Patentability for PCT/US2011/034733 dated Nov. 15, 2012, 8 pages.
First Office Action for Chinese patent application 201180024499.4 dated Dec. 1, 2014, 13 pages.
Examination Report for European patent application 11754570.7 dated Jan. 13, 2015, 5 pages.
Final Office Action for U.S. Appl. No. 13/967,426 dated Apr. 29, 2015, 22 pages.
Cooper, A.J., "Fibre/Radio for the Provision of Cordless/Mobile Telephony Services in the Access Network," Electronics Letters, 1990, pp. 2054-2056, vol. 26, No. 24.
Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12.
Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.
Gibson, B.C., et al., "Evanescent Field Analysis of Air-Silica Microstructure Waveguides," The 14th Annual Meeting of the IEEE Lasers and Electro-Optics Society, 1-7803-7104-4/01, Nov. 12-13, 2001, vol. 2, pp. 709-710.
International Search Report for PCT/US07/21041 dated Mar. 7, 2008, 3 pages.
No Author, "ITU-T G.652, Telecommunication Standardization Sector of ITU, Series G: Transmission Systems and Media, Digital Systems and Networks, Transmission Media Characteristics—Optical Fibre Cables, Characteristics of a Single-Mode Optical Fiber and Cable," ITU-T Recommendation G.652, International Telecommunication Union, Jun. 2005, 20 pages.
No Author, "ITU-T G.657, Telecommunication Standardization Sector of ITU, Dec. 2006, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network," ITU-T Recommendation G.657, International Telecommunication Union, 19 pages.
Kojucharow, K., et al., "Millimeter-Wave Signal Properties Resulting from Electrooptical Upconversion," IEEE Transactions on Microwave Theory and Techniques, Oct. 2001, vol. 49, No. 10, pp. 1977-1985.
Monro, T.M., et al., "Holey Fibers with Random Cladding Distributions," Optics Letters, Feb. 15, 2000, vol. 25, No. 4, pp. 206-208.
Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.
Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.
Paulraj, A.J., et al., "An Overview of MIMO Communications—A Key to Gigabit Wireless," Proceedings of the IEEE, Feb. 2004, vol. 92, No. 2, 34 pages.
Pickrell, G.R., et al., "Novel Techniques for the Fabrication of Holey Optical Fibers," Proceedings of SPIE, Oct. 28-Nov. 2, 2001, vol. 4578, 2002, pp. 271-282.
Opatic, D., "Radio over Fiber Technology for Wireless Access," Ericsson, Oct. 17, 2009, 6 pages.
Roh, W., et al., "MIMO Channel Capacity for the Distributed Antenna Systems," Proceedings of the 56th IEEE Vehicular Technology Conference, Sep. 2002, vol. 2, pp. 706-709.

(56) References Cited

OTHER PUBLICATIONS

Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.
Shen, C., et al., "Comparison of Channel Capacity for MIMO-DAS versus MIMO-CAS," The 9th Asia-Pacific Conference on Communications, Sep. 21-24, 2003, vol. 1, pp. 113-118.
Wake, D. et al., "Passive Picocell: A New Concept in Wireless Network Infrastructure," Electronics Letters, Feb. 27, 1997, vol. 33, No. 5, pp. 404-406.
Winters, J., et al., "The Impact of Antenna Diversity on the Capacity of Wireless Communication Systems," IEEE Transactions on Communications, vol. 42, No. 2/3/4, Feb./Mar./Apr. 1994, pp. 1740-1751.
Mohammed Maalim Qasim et al: "New compact design of dual notched bands UWB antenna with slots in radiating and feeding elements," 2013 IEEE Student Conference on Research and Developement, IEEE, Dec. 16, 2013 (Dec. 16, 2013), pp. 374-379, XP032717446.
Patent Operation Treaty, International Search Report for PCT/IL2015/051061, dated Feb. 15, 2016, 4 pages.
Author Unknown, "ADC Has 3rd Generation Services Covered at CeBIT 2001," Business Wire, Mar. 20, 2001, 3 pages.
Author Unknown, "Andrew Unveils the InCell Fiber Optic Antenna System for In-Building Wireless Communications," Fiber Optics Weekly Update, Dec. 1, 2000, Information Gatekeepers Inc., pp. 3-4.
Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.
Fitzmaurice, M. et al., "Distributed Antenna System for Mass Transit Communications," Vehicular Technology Conference, Boston, Massachusetts, Sep. 2000, IEEE, pp. 2011-2018.
Ghafouri-Shiraz, et al., "Radio on Fibre Communication Systems Based on Integrated Circuit-Antenna Modules," Microwave and Millimeter Wave Technology Proceedings, Beijing, China, Aug. 1998, IEEE, pp. 159-169.
Griffin, R.A. et al., "Radio-Over-Fiber Distribution Using an Optical Millimeter-Wave/DWDM Overlay," Optical Fiber Communication Conference, San Diego, California, Feb. 1999, IEEE, pp. 70-72.
Juntunen, J. et al., "Antenna Diversity Array Design for Mobile Communication Systems," Proceedings of the 2000 IEEE International Conference on Phased Array Systems and Technology, Dana Point, California, May 2000, IEEE, pp. 65-67.
Lee, D. et al., "Ricocheting Bluetooth," 2nd International Conference on Microwave and Millimeter Wave Technology Proceedings, Beijing, China, Sep. 2000, IEEE, pp. 432-435.
Lee, T., "A Digital Multiplexed Fiber Optic Transmission System for Analog Audio Signals," IEEE Western Canada Conference on Computer, Power, and Communications Systems in a Rural Environment, Regina, Saskatchewan, May 1991, pp. 146-149.
Schuh et al., "Hybrid Fibre Radio Access: A Network Operators Approach and Requirements," Proceedings of the 10th Microcoll Conference, Mar. 21-24, 1999, Budapest, Hungary, pp. 211-214.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.
Margotte, B. et al., "Fibre Optic Distributed Antenna System for Cellular and PCN/PCS Indoor Coverage," Microwave Engineering Europe, Jun. 1998, 6 pages.
Matsunaka et al., "Point-to-multipoint Digital Local Distribution Radio System in the 21 GHz Band," KDD Technical Journal, Mar. 1991, No. 145, p. 43-54.
Translation of the First Office Action for Chinese patent application 201180039569.3 dated Jan. 16, 2015, 7 pages.
International Search Report for PCT/US2012/025337 dated May 16, 2012, 4 pages.
Non-final Office Action for U.S. Appl. No. 13/025,719 dated Mar. 31, 2015, 26 pages.
Non-final Office Action for U.S. Appl. No. 13/967,426 dated Dec. 26, 2014, 15 pages.
Translation of the Second Office Action for Chinese Patent Application No. 201610029179.2, dated Feb. 1, 2018, 3 pages.
Decision on Appeal for U.S. Appl. No. 15/049,913, dated Apr. 19, 2018, 8 pages.
Non-Final Office Action for U.S. Appl. No. 15/472,909, dated Mar. 8, 2018, 18 pages.
Final Office Action for U.S. Appl. No. 15/473,827, dated Jan. 26, 2018, 40 pages.
Advisory Action for U.S. Appl. No. 15/473,827, dated Apr. 9, 2018, 3 pages.
Notice of Allowance for U.S. Appl. No. 15/475,589, dated Feb. 7, 2018, 9 pages.

\* cited by examiner

ANALOG DISTRIBUTED ANTENNA SYSTEMS (DASS) SUPPORTING DISTRIBUTION OF DIGITAL COMMUNICATIONS SIGNALS INTERFACED FROM A DIGITAL SIGNAL SOURCE AND ANALOG RADIO FREQUENCY (RF) COMMUNICATIONS SIGNALS

PRIORITY APPLICATION

This application is a continuation of International Application PCT/IL2015/051095 filed on Nov. 12, 2015 which claims the benefit of priority under 35 U.S.C. § 119 of U.S. Provisional Application No. 62/079,090, filed on Nov. 13, 2014, the content of both are relied upon and incorporated herein by reference in their entireties.

BACKGROUND

The disclosure relates generally to distribution of communications signals in a distributed antenna system (DAS), and more particularly to an analog DAS supporting distribution of digital communications signals interfaced from a digital signal source and analog radio frequency (RF) communications signals.

Wireless customers are increasingly demanding digital data services, such as streaming video signals. Concurrently, some wireless customers use their wireless devices in areas that are poorly served by conventional cellular networks, such as inside certain buildings or areas where there is little cellular coverage. One response to the intersection of these two concerns has been the use of DASs. DASs can be particularly useful when deployed inside buildings or other indoor environments where client devices may not otherwise be able to effectively receive RF signals from a source. DASs include remote units configured to receive and transmit communications signals to client devices. The remote units can be provided as remote antenna units configured to wirelessly receive and transmit wireless communications signals in antenna range of the remote antenna units.

A typical DAS comprises head-end equipment (HEE) communicatively coupled to a plurality of remote units. The HEE connects to a variety of wireless services, such as wideband code division multiple access (WCDMA), long term evolution (LTE), and wireless local area network (WLAN) communications services. To distribute such wireless communications services in a DAS, the wireless communications services can be provided in the form of analog RF communications signals to the HEE of the DAS. Analog RF communications signals are RF communications signals that are modulated with carrier frequency and processed as analog signals in the DAS. In some cases, it may be desired for wireless communications services to be distributed as digital signals. In this regard, a digital DAS may be provided that contains distribution components configured to process digital communications signals in baseband for enhanced signal quality and processing. For example, digital signal processing and encoding schemes (e.g., I-Q modulation) can be employed for digital communications signals. Although digital DASs can have advantages over analog DASs, digital DASs can be more expensive than analog DASs due to the additional expense of digital signal processing components.

No admission is made that any reference cited herein constitutes prior art. Applicant expressly reserves the right to challenge the accuracy and pertinency of any cited documents.

SUMMARY

Embodiments disclosed in the detailed description include analog distributed antenna systems (DASs) supporting distribution of digital communications signals interfaced from a digital signal source and analog radio frequency (RF) communications signals. In certain analog DASs disclosed herein, head-end equipment (HEE) is provided and communicatively coupled to a plurality of remote units over a communications medium. Analog RF communications signals received from analog RF signal sources, such as base transceiver stations (BTSs), are distributed in the analog DAS to the plurality of remote units without being digitized. However, the analog DAS is also configured to interface with digital signal sources, such as baseband units (BBUs), and compatibly distribute digital communications signals to analog DAS components. Benefits of digital signal sources include smaller size, lower cost, reduced power consumption, and improved signal quality. In this regard, to support the distribution of digital communications signals received from a digital signal source(s) in the analog DAS, a digital signal interface provided in the HEE is configured to convert downlink digital communications signals received from the digital signal source(s) to downlink analog RF communications signals for distribution to the plurality of remote units in the analog DAS. Further, the digital signal interface is also configured to convert uplink analog RF communications signals received from the plurality of remote units, to uplink digital communications signals to be distributed to the digital signal source(s). By providing the digital signal interface in the HEE, the analog DAS can be configured to interface with the digital signal source(s) and compatibly distribute digital communications signals in an analog DAS to realize the benefits of the digital signals.

One embodiment of the disclosure relates to a HEE signal interface in an analog DAS. The HEE signal interface comprises a downlink communications signal interface configured to receive at least one first downlink analog RF communications signal and at least one second downlink analog RF communications signal to be distributed to at least one remote unit among a plurality of remote units in the analog DAS over a downlink communications medium. The HEE signal interface also comprises an uplink communications signal interface configured to provide at least one first uplink analog RF communications signal and at least one second uplink analog RF communications signal received from the at least one remote unit among the plurality of remote units in the analog DAS over an uplink communications medium. The HEE signal interface also comprises at least one RF signal interface. The at least one RF signal interface is configured to receive the at least one first downlink analog RF communications signal from at least one analog RF signal source. The at least one RF signal interface is also configured to provide the at least one first downlink analog RF communications signal to the downlink communications signal interface. The at least one RF signal interface is also configured to receive the at least one first uplink analog RF communications signal from the uplink communications signal interface. The at least one RF signal interface is also configured to provide the at least one first uplink analog RF communications signal to the at least one analog RF signal source. The HEE signal interface also comprises at least one digital signal interface. The at least one digital signal interface is configured to receive at least one downlink digital communications signal from at least one digital signal source. The at least one digital signal interface is also configured to convert the at least one downlink digital communications signal into the at least one second downlink analog RF communications signal. The at least one digital signal interface is also configured to provide the at least one second downlink analog RF communications signal to the downlink communications signal interface. The at least one digital signal interface is also configured to receive the at least one second uplink analog RF communications signal from the uplink communications signal interface. The at least one digital signal interface is also configured to convert the at least one second uplink analog RF communications signal into at least one uplink digital communications signal. The at least one digital signal interface is also configured to provide the at least one uplink digital communications signal to the at least one digital signal source.

An additional embodiment of the disclosure relates to a method for distributing analog RF communications signals and digital communications signals in an analog DAS. The method comprises distributing downlink analog RF communications signals and downlink digital communications signals in the analog DAS (hereinafter the "method for downlink distribution"). The method for downlink distribution comprises receiving at least one first downlink analog RF communications signal from at least one analog RF signal source. The method for downlink distribution also comprises receiving at least one downlink digital communications signal from at least one digital signal source. The method for downlink distribution also comprises converting the at least one downlink digital communications signal to at least one second downlink analog RF communications signal. The method for downlink distribution also comprises modulating the at least one first downlink analog RF communications signal and the at least one second downlink analog RF communications signal to generate at least one combined downlink analog RF communications signal. The method for downlink distribution also comprises distributing the at least one combined downlink analog RF communications signal to at least one remote unit among a plurality of remote units in the analog DAS over a downlink communications medium. The method for distributing analog RF communications signals and digital communications signals in the analog DAS also comprises distributing uplink analog RF communications signals and uplink digital communications signals in the analog DAS (hereinafter the "method for uplink distribution"). The method for uplink distribution comprises receiving at least one combined uplink analog RF communications signal from the at least one remote unit among the plurality of remote units in the analog DAS over an uplink communications medium. The method for uplink distribution also comprises demodulating the at least one combined uplink analog RF communications signal to generate at least one first uplink analog RF communications signal and at least one second uplink analog RF communications signal. The method for uplink distribution also comprises providing the at least one first uplink analog RF communications signal to the at least one analog RF signal source. The method for uplink distribution also comprises converting the at least one second uplink analog RF communications signal to at least one uplink digital communications signal. The method for uplink distribution also comprises providing the at least one uplink digital communications signal to the at least one digital signal source.

An additional embodiment of the disclosure relates to an analog DAS configured to support analog RF communications signals and digital communications signals distribution. The analog DAS comprises a plurality of remote units. The analog DAS also comprises a head-end equipment (HEE). The HEE comprises at least one RF signal interface communicatively coupled to at least one RF signal source. The HEE also comprises at least one digital signal interface communicatively coupled to at least one digital signal source. The HEE also comprises a downlink communications signal interface coupled to the at least one RF signal interface and the at least one digital signal interface. The HEE also comprises an uplink communications signal interface coupled to the at least one RF signal interface and the at least one digital signal interface. The HEE also comprises a HEE front end interface coupled to the downlink communications signal interface and the uplink communications signal interface. The analog DAS also comprises at least one downlink communications medium coupled to the HEE front end interface and the plurality of remote units. The analog DAS also comprises at least one uplink communications medium coupled to the HEE front end interface and the plurality of remote units.

An additional embodiment of the disclosure relates to a HEE signal interface in an analog DAS. The HEE signal interface comprises a downlink communications signal interface configured to receive at least one downlink analog RF communications signal to be distributed to at least one remote unit among a plurality of remote units in the analog DAS over a downlink communications medium. The HEE signal interface also comprises an uplink communications signal interface configured to provide at least one uplink analog RF communications signal received from the at least one remote unit among the plurality of remote units in the analog DAS over an uplink communications medium. The HEE signal interface also comprises at least one digital signal interface. The at least one digital signal interface is configured to receive at least one downlink digital communications signal from at least one digital signal source. The at least one digital signal interface is also configured to convert the at least one downlink digital communications signal into the at least one downlink analog RF communications signal. The at least one digital signal interface is also configured to provide the at least one downlink analog RF communications signal to the downlink communications signal interface. The at least one digital signal interface is also configured to receive the at least one uplink analog RF communications signal from the uplink communications signal interface. The at least one digital signal interface is also configured to convert the at least one uplink analog RF communications signal into at least one uplink digital communications signal. The at least one digital signal interface is also configured to provide the at least one uplink digital communications signal to the at least one digital signal source.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Various embodiments will be further clarified by the following examples.

Embodiments disclosed in the detailed description include analog distributed antenna systems (DASs) supporting distribution of digital communications signals interfaced from a digital signal source and analog radio frequency (RF) communications signals. In certain analog DASs disclosed herein, head-end equipment (HEE) is provided and communicatively coupled to a plurality of remote units over a communications medium. Analog RF communications signals received from analog RF signal sources, such as base transceiver stations (BTSs), are distributed in the analog DAS to the plurality of remote units without being digitized. However, the analog DAS is also configured to interface with digital signal sources, such as baseband units (BBUs), and compatibly distribute digital communications signals to analog DAS components. Benefits of digital signal sources include smaller size, lower cost, reduced power consumption, and improved signal quality. In this regard, to support the distribution of digital communications signals received from a digital signal source(s) in the analog DAS, a digital signal interface provided in the HEE is configured to convert downlink digital communications signals received from the digital signal source(s) to downlink analog RF communications signals for distribution to the plurality of remote units in the analog DAS. Further, the digital signal interface is also configured to convert uplink analog RF communications signals received from the plurality of remote units, to uplink digital communications signals to be distributed to the digital signal source(s). By providing the digital signal interface in the HEE, the analog DAS can be configured to interface with the digital signal source(s) and compatibly distribute digital communications signals in an analog DAS to realize the benefits of the digital signals.

Figure 1:
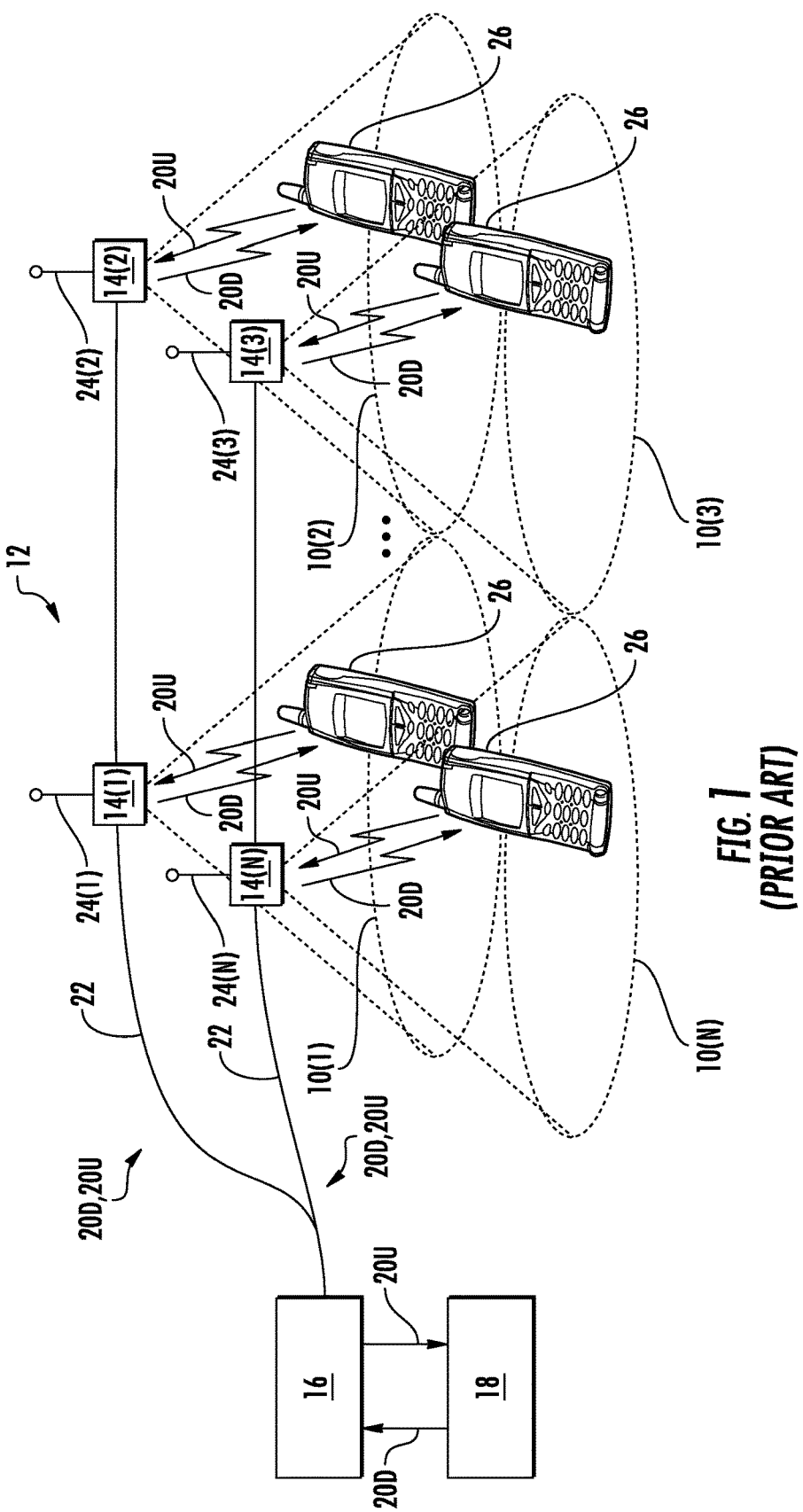
FIG. 1 is a schematic diagram of an exemplary analog distributed antenna system (DAS)
Figure 2:
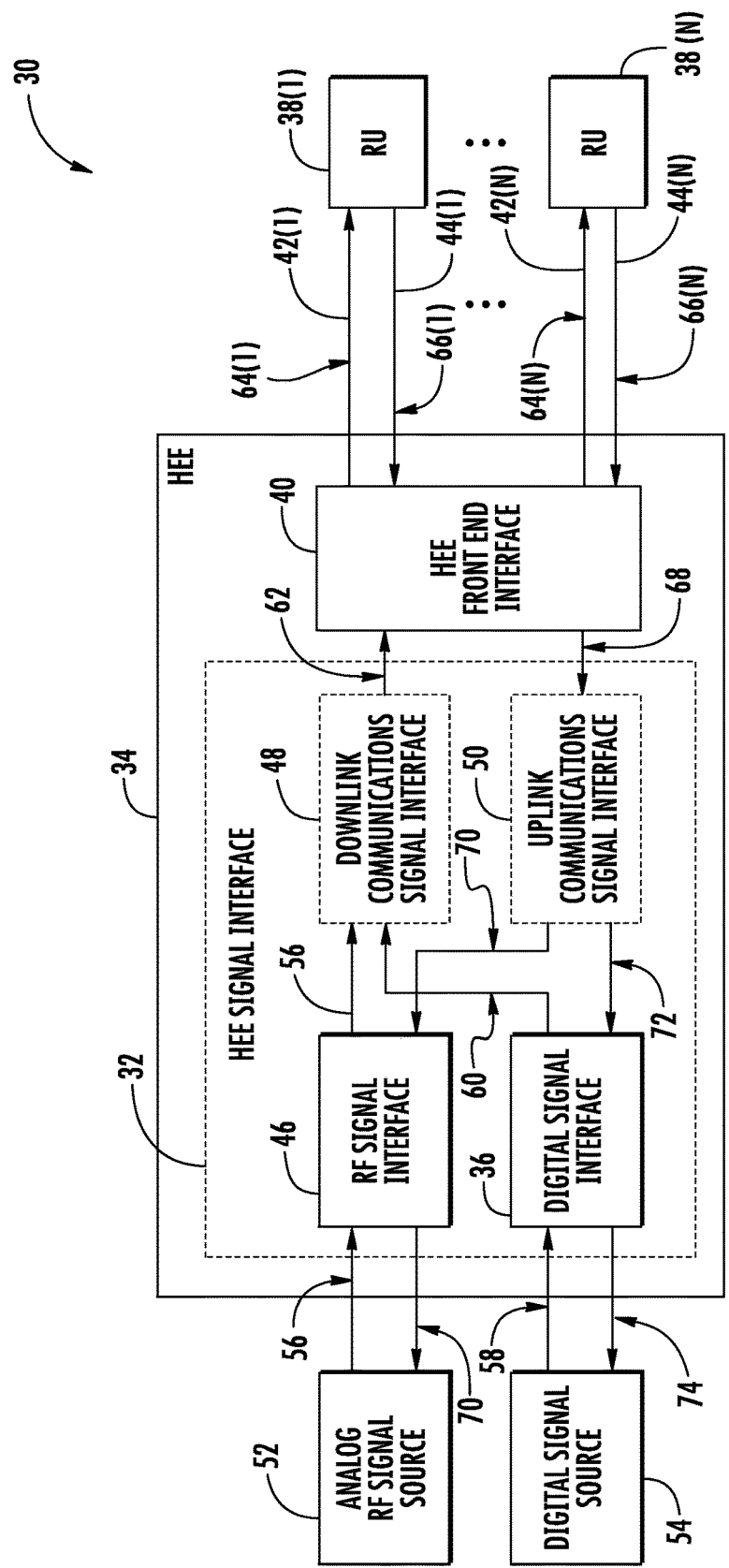
FIG. 2 is a schematic diagram of an exemplary analog DAS configured to support distributions of digital communications signals received from a digital signal source(s) and analog radio frequency (RF) communications signals received from an analog RF signal source(s) over a communications medium by including a head-end equipment (HEE) signal interface, which comprises a digital signal interface configured to provide conversions between digital communications signals and analog RF communications signals.

Before discussing examples of analog DASs supporting analog RF communications signals and digital communications signals distribution in an analog DAS starting at FIG. 2, a discussion of an exemplary analog DAS that employs a communications medium to support only analog wireless communications services to a plurality of remote units is first provided with references to FIG. 1. The discussion of specific exemplary aspects of supporting analog RF communications signals and digital communications signals distribution in an analog DAS using a HEE signal interface is provided starting at FIG. 2.

In this regard, FIG. 1 illustrates distribution of communications services to coverage areas 10(1)-10(N) of an analog DAS 12, wherein 'N' is the number of coverage areas. These communications services can include cellular services, wireless services such as RF identification (RFID) tracking, Wireless Fidelity (Wi-Fi), local area network (LAN), WLAN, and combinations thereof, as examples. The coverage areas 10(1)-10(N) may be remotely located. In this regard, the remote coverage areas 10(1)-10(N) are created by and centered on remote antenna units 14(1)-14(N) connected to a HEE 16 (e.g., a head-end controller or head-end unit or central unit). The HEE 16 may be communicatively coupled to a BTS 18. In this regard, the HEE 16 receives downlink RF communications signals 20D from the BTS 18 to be distributed to the remote antenna units 14(1)-14(N). The remote antenna units 14(1)-14(N) are configured to receive the downlink RF communications signals 20D from the HEE 16 over a communications medium 22 to be distributed to the respective remote coverage areas 10(1)-10(N) of the remote antenna units 14(1)-14(N). In a non-limiting example, the communications medium 22 may be a wired communications medium, a wireless communications medium, or an optical fiber-based communications medium. Each remote antenna unit 14(1)-14(N) may include a RF transmitter/receiver (not shown) and a respective antenna 24(1)-24(N) operably connected to the RF transmitter/receiver to wirelessly distribute the communications services to client devices 26 within their respective remote coverage areas 10(1)-10(N). The remote antenna units 14(1)-14(N) are also configured to receive uplink RF communications signals 20U from the client devices 26 in their respective remote coverage areas 10(1)-10(N) to be distributed to the BTS 18. The size of a given remote coverage area 10(1)-10(N) is determined by the amount of RF power transmitted by the respective remote antenna unit 14(1)-14(N), the receiver sensitivity, antenna gain and the RF environment, as well as by the RF transmitter/receiver sensitivity of the client device 26. The client devices 26 usually have a fixed maximum RF receiver sensitivity, so that the above-mentioned properties of the remote antenna units 14(1)-14(N) mainly determine the size of their respective remote coverage areas 10(1)-10(N).

In the analog DAS 12, the downlink RF communications signal 20D and the uplink RF communications signal 20U are both analog RF communications signals that can be directly modulated onto a carrier signal (e.g., electrical signal, radio signal, light signal, etc.) appropriate for distribution over the communications medium 22. In contrast, a digital communications signal cannot be directly distributed in the analog DAS 12 over the communications medium 22. To illustrate how the analog DAS 12 can be adapted to distribute digital communications signals received from a digital signal source (not shown), FIG. 2 is provided.

In this regard, FIG. 2 is a schematic diagram of an exemplary analog DAS 30. As will be discussed in more detail below, the analog DAS 30 is configured to support distributions of digital communications signals received from a digital signal source(s) and analog RF communications signals received from an analog RF signal source(s) over a communications medium. In this regard, a HEE signal interface 32 is provided in a HEE 34. The HEE signal interface 32 comprises at least one digital signal interface 36 that is configured to provide conversions between digital communications signals and analog RF communications signals. By providing the digital signal interface 36 in the HEE signal interface 32, the analog DAS 30 can be configured to interface with digital signal source(s) and compatibly distribute digital communications signals to realize the benefits of the digital signals.

With continuing reference to FIG. 2, the analog DAS 30 comprises a plurality of remote units 38(1)-38(N) that are communicatively coupled to a HEE front end interface 40 over a plurality of downlink communications mediums 42(1)-42(N) and a plurality of uplink communications mediums 44(1)-44(N). In a non-limiting example, the plurality of downlink communications mediums 42(1)-42(N) and the plurality of uplink communications mediums 44(1)-44(N) are wired communications mediums, wireless communications mediums, or optical fiber-based communications mediums. The HEE signal interface 32 comprises at least one RF signal interface 46, a downlink communications signal interface 48, and an uplink communications signal interface 50. The at least one RF signal interface 46 and the at least one digital signal interface 36 are communicatively coupled to at least one analog RF signal source 52 and at least one digital signal source 54, respectively.

The at least one RF signal interface 46 receives at least one first downlink analog RF communications signal 56 and provides the at least one first downlink analog RF communications signal 56 to the downlink communications signal interface 48. The at least one digital signal interface 36 receives and converts at least one downlink digital communications signal 58 into at least one second downlink analog RF communications signal 60 and provides the at least one second downlink analog RF communications signal 60 to the downlink communications signal interface 48. The downlink communications signal interface 48 combines the at least one first downlink analog RF communications signal 56 and the at least one second downlink analog RF communications signal 60 to create at least one combined downlink analog RF communications signal 62. The HEE front end interface 40 receives the at least one combined downlink analog RF communications signal 62. The HEE front end interface 40 in turn modulates the at least one combined downlink analog RF communications signal 62 into a plurality of medium-adapted downlink analog RF communications signals 64(1)-64(N) that are adapted according to the plurality of downlink communications mediums 42(1)-42(N) and to be transmitted over the plurality of downlink communications mediums 42(1)-42(N) to the plurality of remote units 38(1)-38(N), respectively.

The HEE front end interface 40 receives a plurality of medium-adapted uplink analog RF communications signals 66(1)-66(N) from the plurality of remote units 38(1)-38(N) over the plurality of uplink communications mediums 44(1)-44(N), respectively. The HEE front end interface 40 demodulates the plurality of medium-adapted uplink analog RF communications signals 66(1)-66(N) to generate at least one combined uplink analog RF communications signal 68. The uplink communications signal interface 50 receives the at least one combined uplink analog RF communications signal 68. The uplink communications signal interface 50 then processes the at least one combined uplink analog RF communications signal 68 to generate at least one first uplink analog RF communications signal 70 and at least one second uplink analog RF communications signal 72. The at least one RF signal interface 46 receives and provides the at least one first uplink analog RF communications signal 70 to the at least one analog RF signal source 52. The at least one digital signal interface 36 receives and converts the at least one second uplink analog RF communications signal 72 into at least one uplink digital communications signal 74. The at least one digital signal interface 36 then provides the at least one uplink digital communications signal 74 to the at least one digital signal source 54.

In a non-limiting example, the analog DAS 30 is adapted to only support the at least one digital signal source 54 and the at least one RF signal interface 46 is eliminated from the HEE signal interface 32. As a result, the at least one first downlink analog RF communications signal 56 and the at least one first uplink analog RF communications signal 70 will no longer be present. Nonetheless, the at least one second downlink analog RF communications signal ("the at least one downlink analog RF communications signal") 60 and the at least one second uplink analog RF communications signal ("the at least one uplink analog RF communications signal") 72 are supported in the same way as discussed above.

Figure 3:
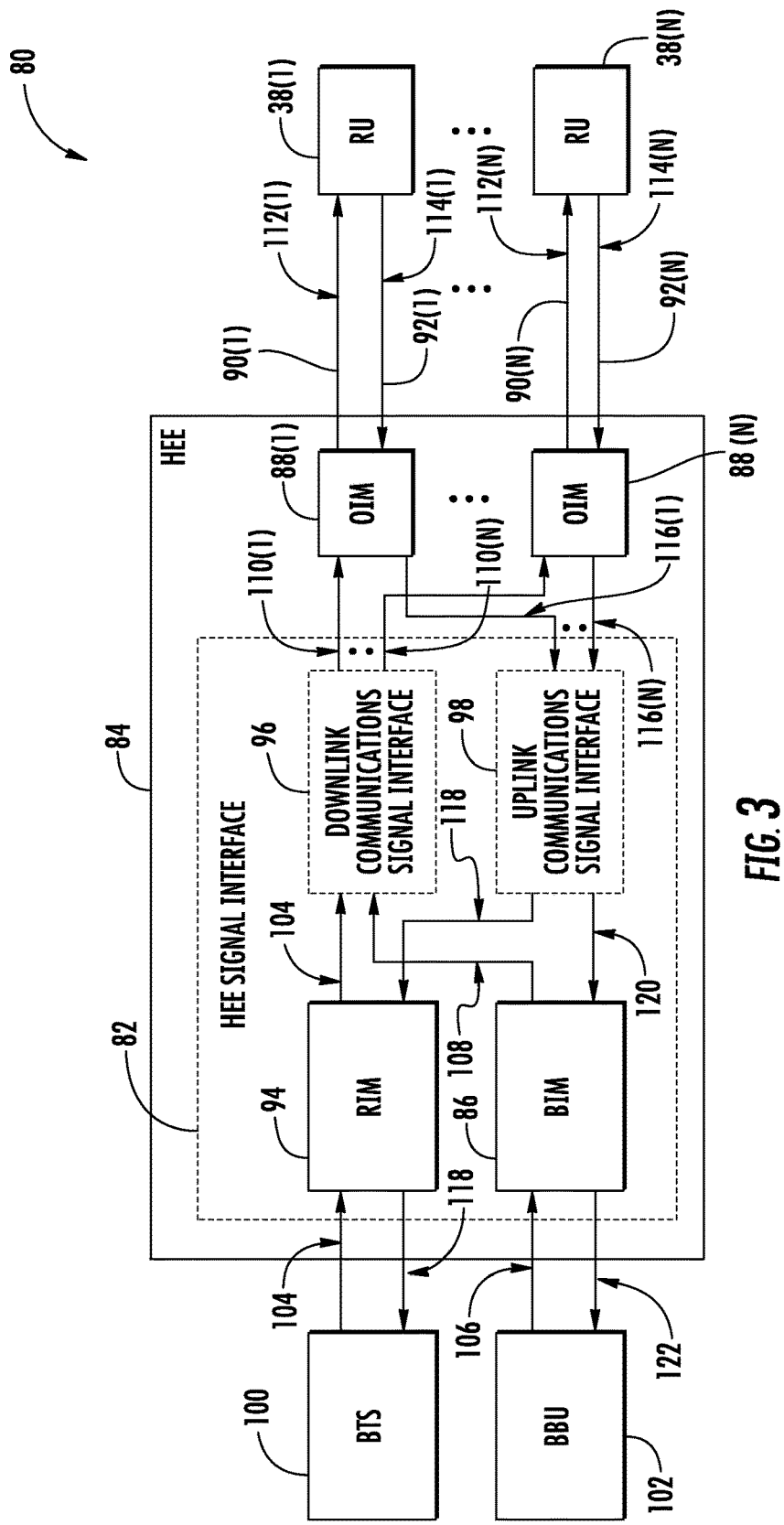
FIG. 3 is a schematic diagram of an exemplary optical fiber-based analog DAS configured to support distributions of analog RF communications signals and digital communications signals over an optical fiber-based communications medium by including a HEE signal interface, which comprises a baseband interface module (BIM) configured to provide conversions between digital communications signals and analog RF communications signals.

FIG. 3 is a schematic diagram of an exemplary optical fiber-based analog DAS 80 configured to support distributions of analog RF communications signals and digital communications signals over an optical fiber-based communications medium by including a HEE signal interface 82 in a HEE 84. The HEE signal interface 82 comprises a baseband interface module (BIM) 86 configured to provide conversions between digital communications signals and analog RF communications signals. Common elements between the analog DAS 30 in FIG. 2 and the optical fiber-based analog DAS 80 in FIG. 3 are shown therein with common element numbers, thus will not be re-described herein.

With reference to FIG. 3, the optical fiber-based analog DAS 80 comprises the plurality of remote units 38(1)-38(N) that are communicatively coupled to a plurality of optical interface modules (OIMs) 88(1)-88(N) in the HEE 84 over a plurality of downlink optical communications mediums 90(1)-90(N) and a plurality of uplink optical communications mediums 92(1)-92(N). The HEE signal interface 82 comprises at least one radio interface module (RIM) 94, a downlink communications signal interface 96, and an uplink communications signal interface 98. The at least one RIM 92 and the BIM 94 are communicatively coupled to at least one BTS 100 and at least one BBU 102, respectively.

The at least one RIM 94 receives at least one first downlink analog RF communications signal 104 and provides the at least one first downlink analog RF communications signal 104 to the downlink communications signal interface 96. The BIM 86 receives and converts at least one downlink digital communications signal 106 into at least one second downlink analog RF communications signal 108 and provides the at least one second downlink analog RF communications signal 108 to the at least one downlink communications signal interface 96. The downlink communications signal interface 96 combines the at least one first downlink analog RF communications signal 104 and the at least one second downlink analog RF communications signal 108 to create a plurality of combined downlink analog RF communications signals 110(1)-110(N). The plurality of OIMs 88(1)-88(N) receives the plurality of combined downlink analog RF communications signals 110(1)-110(N), respectively. The plurality of OIMs 88(1)-88(N) in turn converts the plurality of combined downlink analog RF communications signals 110(1)-110(N) into a plurality of downlink optical communications signals 112(1)-112(N) and transmits the plurality of downlink optical communications signals 112(1)-112(N) to the plurality of remote units 38(1)-38(N), respectively.

The plurality of OIMs 88(1)-88(N) receives a plurality of uplink optical communications signals 114(1)-114(N) from the plurality of remote units 38(1)-38(N) over the plurality of uplink optical communications mediums 92(1)-92(N), respectively. The plurality of OIMs 88(1)-88(N) converts the plurality of uplink optical communications signals 114(1)-114(N) into a plurality of combined uplink analog RF communications signals 116(1)-116(N), respectively. The uplink communications signal interface 98 receives the plurality of combined uplink analog RF communications signals 116(1)-116(N). The uplink communications signal interface 98 then processes the plurality of combined uplink analog RF communications signals 116(1)-116(N) and generates at least one first uplink analog RF communications signal 118 and at least one second uplink analog RF communications signal 120. The at least one RIM 94 receives and provides the at least one first uplink analog RF communications signal 118 to the at least one BTS 100. The BIM 86 receives and converts the at least one second uplink analog RF communications signal 120 into at least one uplink digital communications signal 122. The BIM 86 then provides the at least one uplink digital communications signal 122 to the at least one BBU 102.

Figure 4:
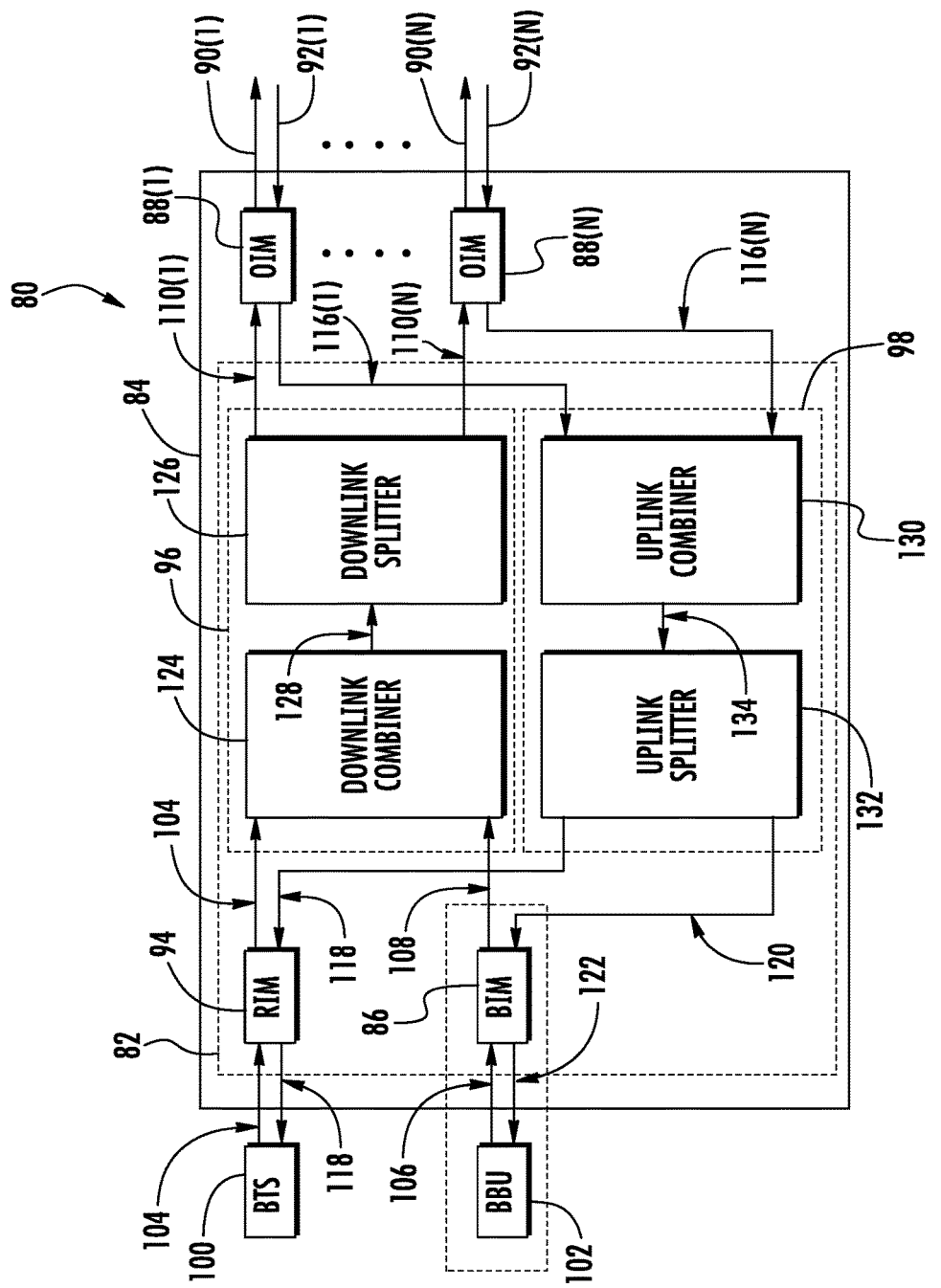
FIG. 4 is a schematic diagram of an exemplary downlink communications signal interface and an exemplary uplink communications signal interface in the HEE signal interface of FIG. 3 configured to support analog RF communications signals distribution and digital communications signals distribution in the optical fiber-based analog DAS of FIG. 3.

In the optical fiber-based analog DAS 80, it may be more efficient to combine analog RF communications signals before providing to the remote units 38(1)-38(N). Likewise, it may be more desirable to split analog RF communications signals received from the remote units 38(1)-38(N) before providing to the RIM 94 and the BIM 86. In this regard, FIG. 4 is a schematic diagram of the exemplary downlink communications signal interface 96 and the exemplary uplink communications signal interface 98 in the HEE signal interface 82 of FIG. 3 configured to support analog RF communications signals distribution and digital communications signals distribution in the optical fiber-based analog DAS 80 of FIG. 3. Common elements between FIG. 3 and FIG. 4 are shown therein with common element number, thus will not be re-described herein. The downlink communications signal interface 96 comprises a downlink combiner 124 and a downlink splitter 126. The downlink combiner 124 receives the at least one first downlink analog RF communications signal 104 and the at least one second downlink analog RF communications signal 108 from the at least one RIM 94 and the BIM 86, respectively. The downlink combiner 124 combines the at least one first downlink analog RF communications signal 104 and the at least one second downlink analog RF communications signal 108 into a first combined downlink analog RF communications signal 128. The downlink splitter 126 receives and replicates the first combined downlink analog RF communications signal 128 to generate the plurality of combined downlink analog RF communications signals 110(1)-110(N). The uplink communications signal interface 98 comprises an uplink combiner 130 and an uplink splitter 132. The uplink combiner 130 also receives the plurality of combined uplink analog RF communications signals 116(1)-116(N). The uplink combiner 130 in turn combines the plurality of combined uplink analog RF communications signals 116(1)-116(N) into a first combined uplink analog RF communications signal 134. The uplink splitter 132 receives the first combined uplink analog RF communications signal 134 and subsequently splits the first combined uplink analog RF communications signal 134 into the at least one first uplink analog RF communications signal 118 and the at least one second uplink analog RF communications signal 120.

Figure 5:
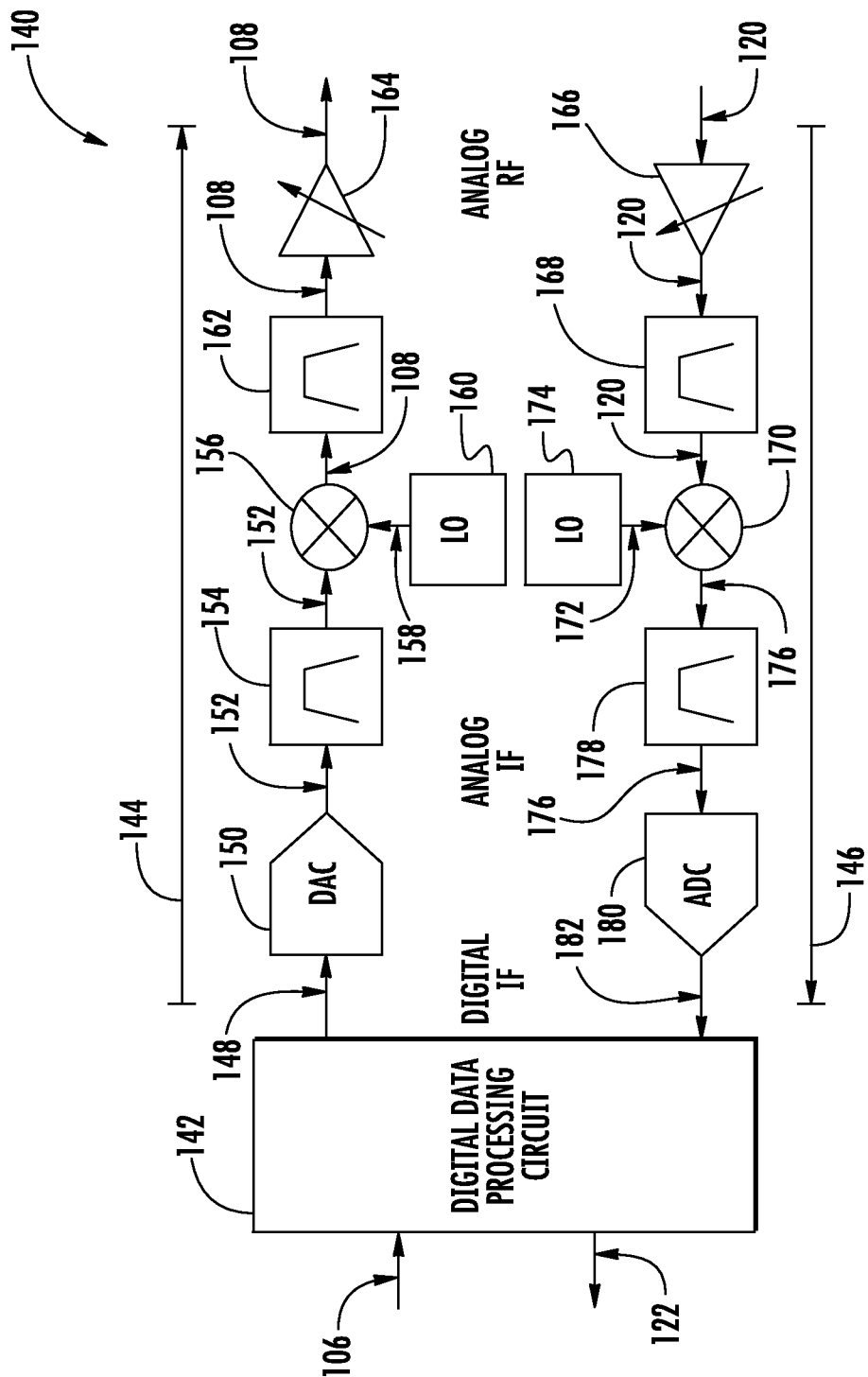
FIG. 5 is a schematic diagram of an exemplary BIM, which can be provided in the HEE signal interface of FIGS. 3 and 4, configured to provide conversions between digital communications signals and analog RF communications signals by employing an intermediate frequency (IF) as intermediate signal during the conversions.

Although the BIM 86 is shown to be inside the HEE 84 in FIG. 4, the BIM 86 may also be located inside the BBU 102 as a non-limiting example. When there is more than one (1) BIM provided in the optical fiber-based analog DAS 80, it is also possible to configure a mixture of HEE-incorporated and BBU-incorporated BIMs in the optical fiber-based analog DAS 80. In this regard, FIG. 5 is a schematic diagram of an exemplary BIM 140, which can be provided in the HEE signal interface 82 of FIGS. 3 and 4, configured to provide conversions between digital communications signals and analog RF communications signals by employing an intermediate frequency (IF) as intermediate signal during the conversions. Elements in FIG. 3 are referenced in connection with FIG. 5 and will not be re-described herein. The BIM 140 comprises a digital data processing circuit 142, a downlink signal processing path 144, and an uplink signal processing path 146. In a non-limiting example, the digital data processing circuit 142 may be a software function, a hardware element, or a combination of both. More specifically, the digital data processing circuit 142 may be a field programmable gate array (FPGA) circuit.

On the downlink signal processing path 144, the digital data processing circuit 142 receives the at least one downlink digital communications signal 106, which carries formatted downlink data packets (not shown) from the at least one BBU 102 (not shown). In a non-limiting example, the formatted downlink data packets (not shown) conform to a common public radio interface (CPRI) format. The digital data processing circuit 142 is configured to de-capsulate the formatted downlink data packets (not shown) into consecutive downlink digital words (not shown). The consecutive downlink digital words (not shown) are then modulated to generate at least one downlink digital IF signal 148. A digital-to-analog converter (DAC) 150 receives and converts the at least one downlink digital IF signal 148 to at least one downlink analog IF signal 152. A first downlink filter 154 is provided to remove or attenuate unwanted products and harmonics from the at least one downlink analog IF signal 152. A downlink modulator 156 is provided to receive the at least one downlink analog IF signal 152 after the at least one downlink analog IF signal 152 passes through the first downlink filter 154. The downlink modulator 156 in turn modulates the at least one downlink analog IF signal 152 based on a mixing frequency 158 provided by a first local oscillator 160 to generate the at least one second downlink analog RF communications signal 108. By controlling the mixing frequency 158, a center frequency of the at least one second downlink analog RF communications signal 108 may be adjusted to match a RF frequency used by the optical fiber-based analog DAS 80 (not shown). A second downlink filter 162 is provided to remove or attenuate unwanted products and harmonics from the at least one second downlink analog RF communications signal 108. A downlink variable gain amplifier 164 adjusts the at least one second downlink analog RF communications signal 108 to a first predetermined power level before providing to the downlink communications signal interface 96 (not shown).

With continuing reference to FIG. 5, on the uplink signal processing path 146, an uplink variable gain amplifier 166 receives the at least one second uplink analog RF communications signal 120 from the uplink communications signal interface 98 (not shown). The uplink variable gain amplifier 166 is configured to adjust the at least one second uplink analog RF communications signal 120 to a second predetermined power level. The at least one second uplink analog RF communications signal 120 is then received by a first uplink filter 168, which is configured to remove or attenuate unwanted products and harmonics in the at least one second uplink analog RF communications signal 120. An uplink modulator 170 is provided to receive the at least one second uplink analog RF communications signal 120 after the at least one second uplink analog RF communications signal 120 passes through the first uplink filter 168. The uplink modulator 170 in turn modulates the at least one second uplink analog RF communications signal 120 based on a mixing frequency 172 provided by a second local oscillator 174 to generate the at least one uplink analog IF signal 176. A second uplink filter 178 is provided to remove or attenuate unwanted products and harmonics from the at least one uplink analog IF signal 176. An analog-to-digital converter (ADC) 180 receives and converts the at least one uplink analog IF signal 176 into at least one uplink digital IF signal 182. The at least one uplink digital IF signal 182 is then provided to the digital data processing circuit 142 where the at least one uplink digital IF signal 182 is demodulated to generate consecutive uplink digital words (not shown). The digital data processing circuit 142 is further configured to encapsulate the consecutive uplink digital words (not shown) in formatted uplink data packets (not shown). In a non-limiting example, the formatted uplink data packets (not shown) also conform to the CPRI format. Subsequently, the digital data processing circuit 142 provides the at least one uplink digital communications signal 122, which carries the formatted uplink data packets (not shown), to the at least one BBU 102 (not shown).

Figure 6:
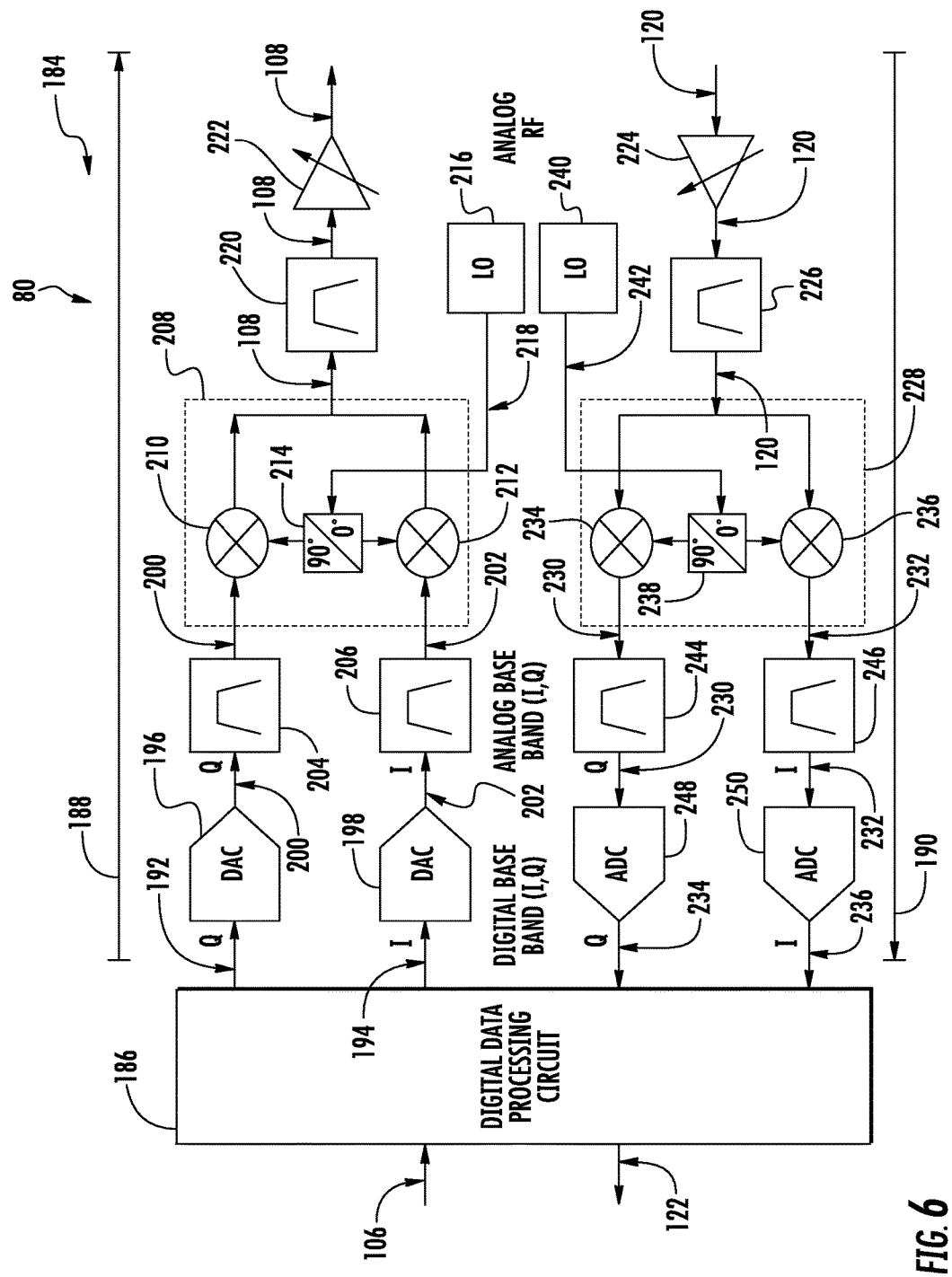
FIG. 6 is a schematic diagram of another exemplary BIM, which can be provided in the HEE signal interface of FIGS. 3 and 4, configured to provide conversions between digital communications signals and analog RF communications signals by employing a quadrature (Q) signal and an in-phase (I) signal as intermediate signals during the conversions.

Digital and analog IF signals used in the BIM 140 in FIG. 5 are often carefully chosen to avoid interference with the at least one second downlink analog RF communications signal 108 and the at least one second uplink analog RF communications signal 120. Signal processing qualities in the BIM 140 will improve as a result. In addition, the digital and analog IF signals may also be chosen to have a higher bandwidth, which may lead to improved performance and throughput during signal processing by the BIM 140. However, using digital and analog IF signals as a means for converting between digital communications signals and analog RF communications signals typically increases complexity of the digital data processing circuit 142 and may increase the cost of the BIM 140. As a lower cost alternative to the BIM 140 in FIG. 5, FIG. 6 is a schematic diagram of another exemplary BIM 184, which can be provided in the HEE signal interface 82 of FIGS. 3 and 4, configured to provide conversions between digital communications signals and analog RF communications signals by employing a quadrature (Q) signal and an in-phase (I) signal as intermediate signals during the conversions. Elements of FIG. 3 are referenced in connection with FIG. 6 and will not be re-described herein. The BIM 184 comprises a digital data processing circuit 186, a downlink signal processing path 188, and an uplink signal processing path 190. In a non-limiting example, the digital data processing circuit 186 may be a software function, a hardware element, or a combination of both. More specifically, the digital data processing circuit 186 may be a FPGA circuit.

On the downlink signal processing path 188, the digital data processing circuit 186 receives the at least one downlink digital communications signal 106, which carries formatted downlink data packets (not shown), from the at least one BBU 102 (not shown). In a non-limiting example, the formatted downlink data packets (not shown) conform to the CPRI format. The digital data processing circuit 186 is configured to de-capsulate the formatted downlink data packets (not shown) into consecutive downlink digital words (not shown) represented in at least one Q stream (not shown) and at least one I stream (not shown). The at least one Q stream (not shown) and at least one I stream (not shown) are then modulated at the digital data processing circuit 186 to generate at least one downlink digital baseband Q signal 192 and at least one downlink digital baseband I signal 194, respectively. A downlink Q signal DAC 196 and a downlink I signal DAC 198 are provided on the downlink signal processing path 188 to convert the at least one downlink digital baseband Q signal 192 and the at least one downlink digital baseband I signal 194 into at least one downlink analog baseband Q signal 200 and at least one downlink analog baseband I signal 202, respectively. A first downlink Q signal filter 204 and a first downlink I signal filter 206 are provided to remove or attenuate unwanted products and harmonics from the at least one downlink analog baseband Q signal 200 and the at least one downlink analog baseband I signal 202, respectively.

A downlink quadrature modulator 208 in turn combines the at least one downlink analog baseband Q signal 200 and the at least one downlink analog baseband I signal 202 to generate the at least one second downlink analog RF communications signal 108. In a non-limiting example, the downlink quadrature modulator 208 comprises a downlink Q signal modulator 210 and a downlink I signal modulator 212. A downlink phase shifter 214 is coupled to the downlink Q signal modulator 210 and the downlink I signal modulator 212 to provide orthogonally between the downlink Q signal modulator 210 and the downlink I signal modulator 212. The downlink quadrature modulator 208 also comprises a first local oscillator 216, which is coupled to the downlink phase shifter 214 and configured to provide a downlink mixing frequency 218. By controlling the downlink mixing frequency 218, a center frequency of the at least one second downlink analog RF communications signal 108 may be adjusted to match a RF frequency used by the optical fiber-based analog DAS 80. A second downlink filter 220 is provided to remove or attenuate unwanted products and harmonics from the at least one second downlink analog RF communications signal 108. A downlink variable gain amplifier 222 adjusts the at least one second downlink analog RF communications signal 108 to a first predetermined power level before providing to the downlink communications signal interface 96 (not shown).

On the uplink signal processing path 190, an uplink variable gain amplifier 224 receives the at least one second uplink analog RF communications signal 120 from the uplink communications signal interface 98 (not shown). The uplink variable gain amplifier 224 is configured to adjust the at least one second uplink analog RF communications signal 120 to a second predetermined power level. The at least one second uplink analog RF communications signal 120 is then received by a first uplink filter 226, which is configured to remove or attenuate unwanted products and harmonics in the at least one second uplink analog RF communications signal 120. An uplink quadrature demodulator 228 receives and separates the at least one second uplink analog RF communications signal 120 to generate at least one uplink analog baseband Q signal 230 and at least one uplink analog baseband I signal 232. In a non-limiting example, the uplink quadrature demodulator 228 comprises an uplink Q signal modulator 234 and an uplink I signal modulator 236. An uplink phase shifter 238 is coupled to the downlink Q signal modulator 234 and the downlink I signal modulator 236 to provide orthogonality between the uplink Q signal modulator 234 and the uplink I signal modulator 236. The uplink quadrature demodulator 228 also comprises a second local oscillator 240, which is coupled to the uplink phase shifter 238 and configured to provide an uplink mixing frequency 242. By controlling the uplink mixing frequency 242, a center frequency of the at least one uplink analog baseband Q signal 230 and the at least one uplink analog baseband I signal 232 may be adjusted to match a baseband frequency used by the at least one BBU 102 (not shown).

A second uplink Q signal filter 244 and a second uplink I signal filter 246 are provided to remove or attenuate unwanted products and harmonics from the at least one uplink analog baseband Q signal 230 and the at least one uplink analog baseband I signal 232, respectively. Subsequently, an uplink Q signal ADC 248 and an uplink I signal ADC 250 are provided on the uplink signal processing path 190 to convert the at least one uplink analog baseband Q signal 230 and the at least one uplink analog baseband I signal 232 into at least one uplink digital baseband Q signal 234 and at least one uplink digital baseband I signal 236, respectively. The at least one uplink digital baseband Q signal 234 and the at least one uplink digital baseband I signal 236 are received by the digital data processing circuit 186 and demodulated to generate consecutive uplink digital words represented in at least one Q stream (not shown) and at least one I stream (not shown), respectively. The digital data processing circuit 186 then encapsulates the at least one Q stream (not shown) and the at least one I stream (not shown) into formatted uplink data packets (not shown). In a non-limiting example, the formatted uplink data packets (not shown) also conform to the CPRI format. Subsequently, the digital data processing circuit 186 provides the at least one uplink digital communications signal 122, which carries the formatted uplink data packets (not shown), to the at least one BBU 102 (not shown).

Figure 7A:
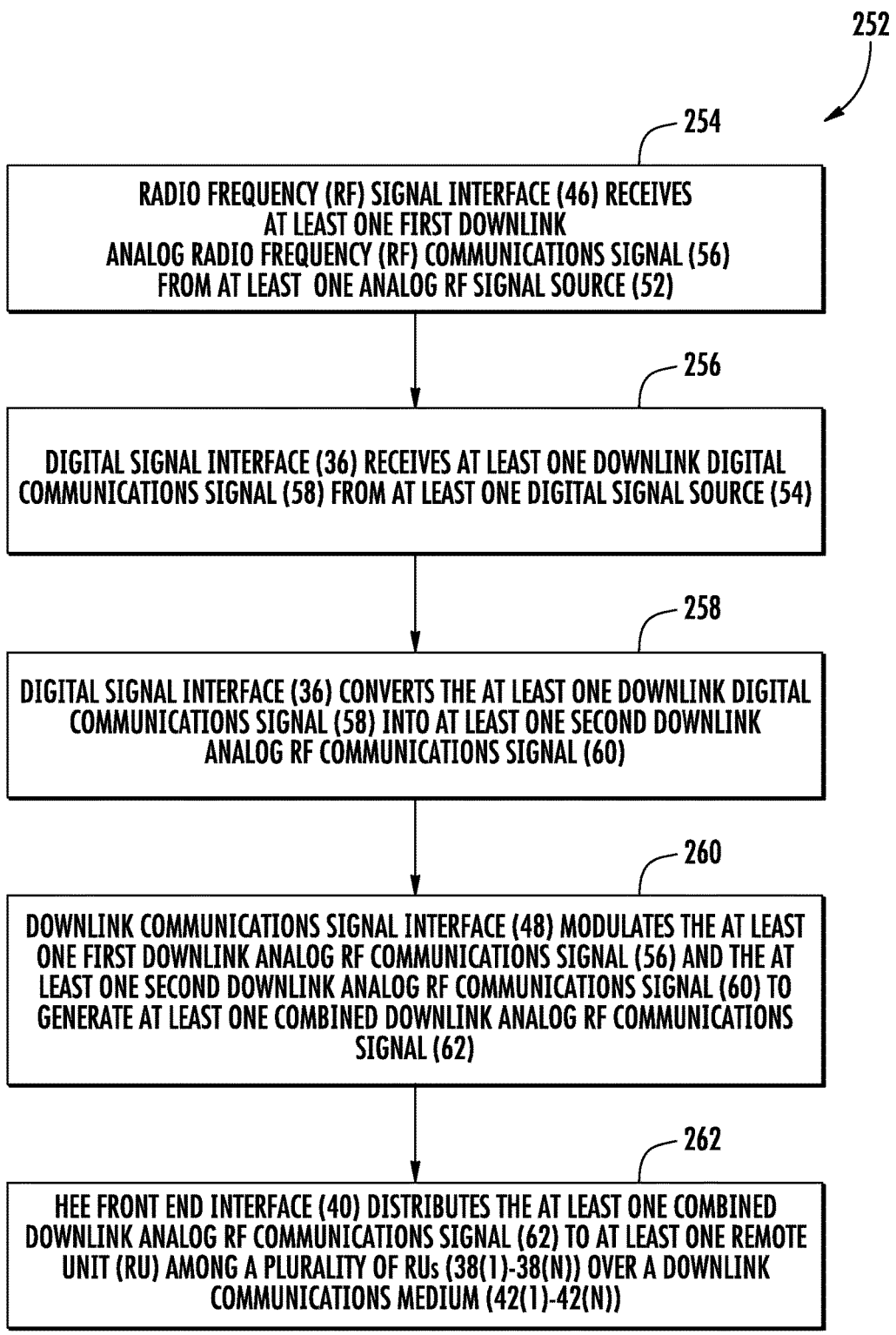
FIG. 7A is a flowchart of an exemplary process for supporting downlink digital communications signals in the analog DASs in FIGS. 2 and 3, by converting downlink digital communications signals received from a digital signal source(s) to downlink analog RF communications signals to be distributed to a plurality of remote units.

FIG. 7A is a flowchart of an exemplary process for distributing downlink digital communications signals 58 and 106 in the analog DAS 30 of FIG. 2 and the optical fiber-based analog DAS 80 of FIG. 3, respectively, to the plurality of remote units 38(1)-38(N). In this regard, FIG. 7A provides a downlink communications signal distribution process 252. According to the downlink communications signal distribution process 252, the RF signal interface 46 receives the at least one first downlink analog RF communications signal 56 from the at least one analog RF signal source 52 (block 254). The digital signal interface 36 receives the at least one downlink digital communications signal 58 from the at least one digital signal source 54 (block 256). The digital signal interface 36 converts the at least one downlink digital communications signal 58 into the at least one second downlink analog RF communications signal 60 (block 258). The downlink communications signal interface 48 modulates the at least one first downlink analog RF communications signal 56 and the at least one second downlink analog RF communications signal 60 to generate the at least one combined downlink analog RF communications signal 62 (block 260). Finally, the HEE front end interface 40 distributes the at least one combined downlink analog RF communications signal 62 to at least one remote unit among the plurality of remote units 38(1)-38(N) over the plurality of downlink communications mediums 42(1)-42(N) (block 262).

Figure 7B:
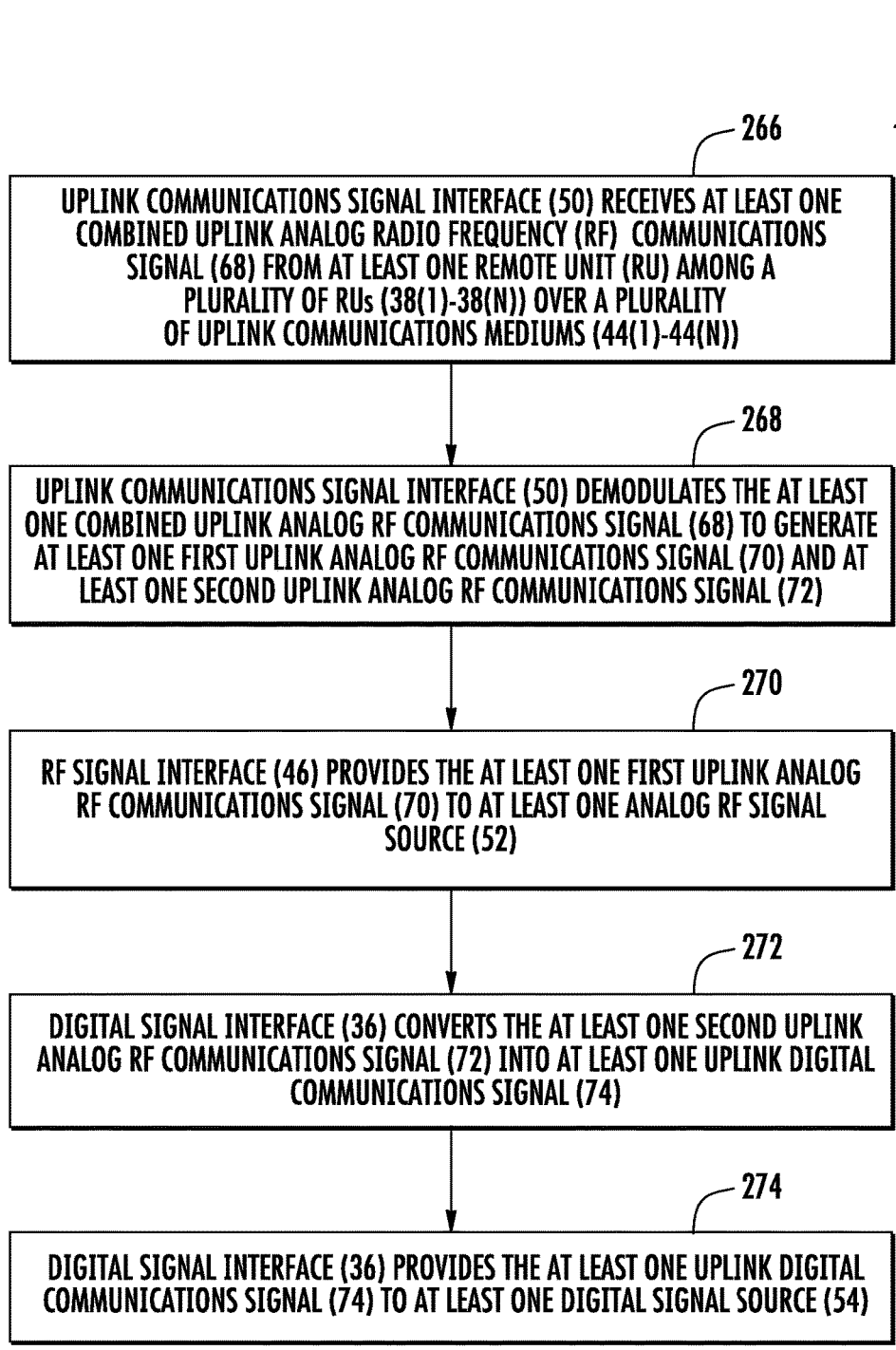
FIG. 7B is a flowchart of an exemplary process for supporting uplink digital communications signals in the analog DASs of FIGS. 2 and 3, by converting the uplink analog RF communications signals received from a plurality of remote units to uplink digital communications signals to be provided to a digital signal source(s)

FIG. 7B is a flowchart of an exemplary process for distributing the uplink digital communications signals 74 and 122 in the analog DAS 30 of FIG. 2 and the optical fiber-based analog DAS 80 of FIG. 3 to the digital signal source(s) 54 and the at least one BBU 102, respectively. In this regard, FIG. 7B provides an uplink communications signal distribution process 264. According to the uplink communications signal distribution process 264, the uplink communications signal interface 50 receives the at least one combined uplink analog RF communications signal 68 from at least one remote unit among a plurality of remote units 38(1)-38(N) over a plurality of uplink communications mediums 44(1)-44(N) (block 266). The at least one uplink communications signal interface 50 demodulates the at least one combined uplink analog RF communications signal 68 to generate the at least one first uplink analog RF communications signal 70 and the at least one second uplink analog RF communications signal 72 (block 268). Next, the at least one RF signal interface 46 provides the at least one first uplink analog RF communications signal 70 to the at least one analog RF signal source 52 (block 270). The at least one digital signal interface 36 converts the at least one second uplink analog RF communications signal 72 into the at least one uplink digital communications signal 74 (block 272). The at least one digital signal interface 36 then provides the at least one uplink digital communications signal 74 to the at least one digital signal source 54 (block 274).

Figure 8:
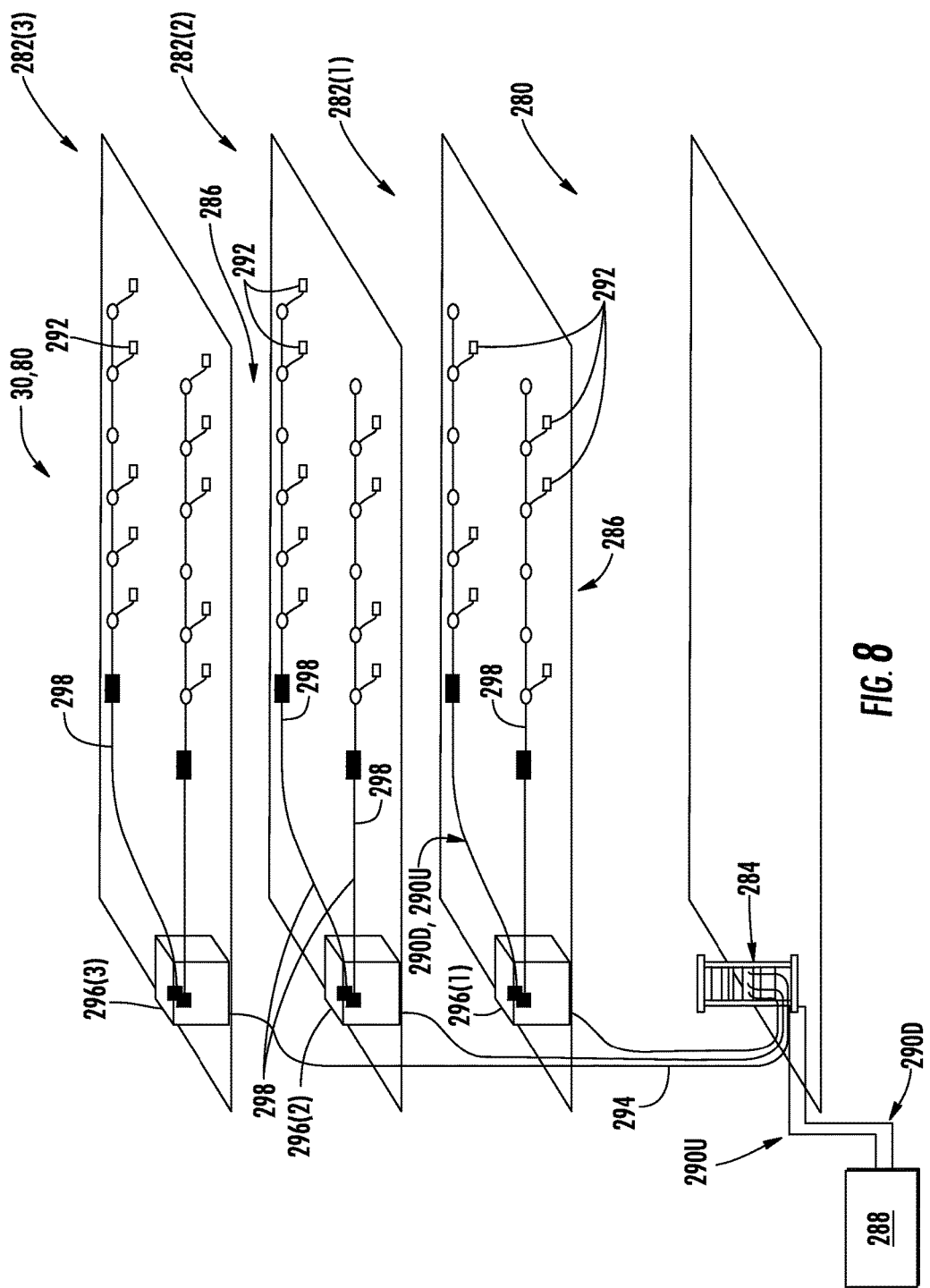
FIG. 8 is a partially schematic cut-away diagram of an exemplary building infrastructure in which an analog DAS, including the analog DASs in FIGS. 2 and 3, that include a digital signal interface in a HEE to support distribution of digital communications signals, can be employed.

The analog DAS 30 in FIG. 2 and the optical fiber-based analog DAS 80 in FIG. 3 may be provided in an indoor environment, as illustrated in FIG. 8. FIG. 8 is a partially schematic cut-away diagram of an exemplary building infrastructure in which an analog DAS, including the analog DASs in FIGS. 2 and 3, that includes a digital signal interface in a HEE to support distribution of digital communications signals can be employed. The building infrastructure 280 in this embodiment includes a first (ground) floor 282(1), a second floor 282(2), and a third floor 282(3). The floors 282(1)-282(3) are serviced by a central unit 284 to provide antenna coverage areas 286 in the building infrastructure 280. The central unit 284 is communicatively coupled to the base station 288 to receive downlink communications signals 290D from the base station 288. The central unit 284 is communicatively coupled to remote antenna units 292 to receive uplink communications signals 290U from the remote antenna units 292, as previously discussed above. The downlink and uplink communications signals 290D, 290U communicated between the central unit 284 and the remote antenna units 292 are carried over a riser cable 294. The riser cable 294 may be routed through interconnect units (ICUs) 296(1)-296(3) dedicated to each of the floors 282(1)-282(3) that route the downlink and uplink communications signals 290D, 290U to the remote antenna units 292 and also provide power to the remote antenna units 292 via array cables 298.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for distributing analog radio frequency (RF) communications signals and digital communications signals in an analog distributed antenna system (DAS), comprising:
    distributing downlink analog RF communications signals and downlink digital communications signals in the analog DAS, comprising:
        receiving at least one first downlink analog RF communications signal from at least one analog RF signal source;
        receiving at least one downlink digital communications signal from at least one digital signal source;
        converting the at least one downlink digital communications signal to at least one second downlink analog RF communications signal;
        modulating the at least one first downlink analog RF communications signal and the at least one second downlink analog RF communications signal to generate at least one combined downlink analog RF communications signal; and
        distributing the at least one combined downlink analog RF communications signal to at least one remote unit among a plurality of remote units in the analog DAS over a downlink communications medium; and
    distributing uplink analog RF communications signals and uplink digital communications signals in the analog DAS, comprising:
        receiving at least one combined uplink analog RF communications signal from the at least one remote unit among the plurality of remote units in the analog DAS over an uplink communications medium;
        demodulating the at least one combined uplink analog RF communications signal to generate at least one first uplink analog RF communications signal and at least one second uplink analog RF communications signal;
        providing the at least one first uplink analog RF communications signal to the at least one analog RF signal source;
        converting the at least one second uplink analog RF communications signal to at least one uplink digital communications signal; and
        providing the at least one uplink digital communications signal to the at least one digital signal source,
    wherein converting the at least one downlink digital communications signal to the at least one second downlink analog RF communications signal further comprises:
        receiving formatted downlink data packets from the at least one downlink digital communications signal;
        de-capsulating the formatted downlink data packets into consecutive downlink digital words;
        modulating the consecutive downlink digital words to generate at least one downlink digital intermediate frequency (IF) signal;
        converting the at least one downlink digital IF signal to at least one downlink analog IF signal;
        attenuating unwanted products and harmonics in the at least one downlink analog IF signal;
        modulating the at least one downlink analog IF signal to generate the at least one second downlink analog RF communications signal;
        attenuating unwanted products and harmonics in the at least one second downlink analog RF communications signal; and
        adjusting the at least one second downlink analog RF communications signal to a first predetermined power level.

2. The method of claim 1, further comprising receiving common public radio interface (CPRI) formatted downlink data packets from the at least one downlink digital communications signal.

3. The method of claim 1, further comprising converting the at least one downlink digital IF signal to the at least one downlink analog IF signal using a digital-to-analog converter (DAC).

4. The method of claim 1, further comprising modulating the at least one downlink analog IF signal to generate the at least one second downlink analog RF communications signal based on a mixing frequency provided by a first local oscillator.

5. The method of claim 1, wherein converting the at least one second uplink analog RF communications signal to the at least one uplink digital communications signal further comprises:
    adjusting the at least one second uplink analog RF communications signal to a second predetermined power level;
    attenuating unwanted products and harmonics in the at least one second uplink analog RF communications signal;
    modulating the at least one second uplink analog RF communications signal to generate at least one uplink analog intermediate frequency (IF) signal;
    attenuating unwanted products and harmonics in the at least one uplink analog IF signal;
    converting the at least one uplink analog IF signal to at least one uplink digital IF signal;
    demodulating the at least one uplink digital IF signal to generate consecutive uplink digital words;
    encapsulating the consecutive uplink digital words in formatted uplink data packets; and providing the formatted uplink data packets in the at least one uplink digital communications signal.

6. The method of claim 5, further comprising providing common public radio interface (CPRI) formatted uplink data packets in the at least one uplink digital communications signal.

7. The method of claim 6, further comprising converting the at least one uplink analog IF signal to the at least one uplink digital IF signal using an analog-to-digital converter (ADC).

8. The method of claim 6, further comprising modulating the at least one second uplink analog RF communications signal to generate the at least one uplink analog IF signal based on a mixing frequency provided by a second local oscillator.

9. The method of claim 1, wherein converting the at least one downlink digital communications signal to the at least one second downlink analog RF communications signal further comprises:
    receiving formatted downlink data packets from the at least one downlink digital communications signal;
    de-capsulating the formatted downlink data packets into consecutive downlink digital words represented in at least one quadrature (Q) stream and at least one in-phase (I) stream;
    modulating the at least one Q stream and the at least one I stream to generate at least one downlink digital baseband quadrature (Q) signal and at least one downlink digital baseband in-phase (I) signal, respectively;
    converting the at least one downlink digital baseband Q signal and the at least one downlink digital baseband I signal to at least one downlink analog baseband Q signal and at least one downlink analog baseband I signal, respectively;
    attenuating unwanted products and harmonics in the at least one downlink analog baseband Q signal and the at least one downlink analog baseband I signal;
    combining the at least one downlink analog baseband Q signal and the at least one downlink analog baseband I signal to generate the at least one second downlink analog RF communications signal;
    attenuating unwanted products and harmonics in the at least one second downlink analog RF communications signal; and
    adjusting the at least one second downlink analog RF communications signal to a first predetermined power level.

10. The method of claim 9, further comprising receiving common public radio interface (CPRI) formatted downlink data packets from the at least one downlink digital communications signal.

11. The method of claim 10, further comprising converting the at least one downlink digital baseband Q signal and the at least one downlink digital baseband I signal to the at least one downlink analog baseband Q signal and the at least one downlink analog baseband I signal, respectively, using digital-to-analog converters (DACs).

12. The method of claim 10, further comprising modulating the at least one downlink analog baseband Q signal and the at least one downlink analog baseband I signal to generate the at least one second downlink analog RF communications signal based on a mixing frequency provided by a first local oscillator.

13. The method of claim 1, wherein converting the at least one second uplink analog RF communications signal to the at least one uplink digital communications signal further comprises:
    adjusting the at least one second uplink analog RF communications signal to a second predetermined power level;
    attenuating unwanted products and harmonics in the at least one second uplink analog RF communications signal;
    separating the at least one second uplink analog RF communications signal to generate at least one uplink analog baseband quadrature (Q) signal and at least one uplink analog baseband in-phase (I) signal;
    attenuating unwanted products and harmonics in the at least one uplink analog baseband Q signal and the at least one uplink analog baseband I signal;
    converting the at least one uplink analog baseband Q signal and the at least one uplink analog baseband I signal to at least one uplink digital baseband Q signal and at least one uplink digital baseband I signal, respectively;
    demodulating the at least one uplink digital baseband Q signal and the at least one uplink digital baseband I signal to generate consecutive uplink digital words represented in at least one Q stream and at least one I stream, respectively;
    encapsulating the at least one Q stream and the at least one I stream into formatted uplink data packets; and
    providing the formatted uplink data packets in the at least one uplink digital communications signal.

14. The method of claim 13, further comprising providing common public radio interface (CPRI) formatted uplink data packets in the at least one uplink digital communications signal.

15. The method of claim 14, further comprising converting the at least one uplink analog baseband Q signal and the at least one uplink analog baseband I signal to at least one uplink digital baseband Q signal and at least one uplink digital baseband I signal, respectively, using analog-to-digital converters (ADCs).

16. The method of claim 14, further comprising modulating the at least one second uplink analog RF communications signal to generate the at least one uplink analog baseband Q signal and the at least one uplink analog baseband I signal based on a mixing frequency provided by a second local oscillator.

* * * * *